United States Patent [19]

Sakakibara et al.

[11] Patent Number: 5,022,072

[45] Date of Patent: Jun. 4, 1991

[54] COMMUNICATION APPARATUS

[75] Inventors: Kenzou Sakakibara, Yokohama; Takehiro Yoshida; Koichi Matsumoto, both of Tokyo, all of Japan

[73] Assignee: Canon Kabushiki Kaisha, Tokyo, Japan

[21] Appl. No.: 490,515

[22] Filed: Mar. 1, 1990

Related U.S. Application Data

[63] Continuation of Ser. No. 881,802, Jul. 3, 1986, abandoned.

[30] Foreign Application Priority Data

Jul. 9, 1985 [JP] Japan ................... 60-149331
Aug. 14, 1985 [JP] Japan ................... 60-177613
Aug. 14, 1985 [JP] Japan ................... 60-177614
Aug. 14, 1985 [JP] Japan ................... 60-177615
Oct. 7, 1985 [JP] Japan ................... 60-223374

[51] Int. Cl.⁵ ................... H04M 11/00; H04N 1/32
[52] U.S. Cl. ................... 379/100; 379/97; 358/400; 358/435
[58] Field of Search ................... 379/100, 97, 104, 105; 358/400, 435, 407

[56] References Cited

U.S. PATENT DOCUMENTS

| | | | |
|---|---|---|---|
| 4,113,993 | 9/1978 | Heckman et al. | 379/100 |
| 4,161,728 | 7/1979 | Insam | 379/97 X |
| 4,207,598 | 6/1980 | Reich et al. | 379/100 |
| 4,321,626 | 3/1982 | Wada | 379/100 X |
| 4,503,288 | 3/1985 | Kessler | 379/96 X |
| 4,532,379 | 7/1985 | Tsukioka | 379/100 |
| 4,578,537 | 3/1986 | Faggin et al. | 379/100 X |
| 4,584,434 | 4/1986 | Hashimoto | 379/105 X |
| 4,608,457 | 8/1986 | Fowler et al. | 379/96 X |
| 4,646,160 | 2/1987 | Iizuka et al. | 379/100 X |
| 4,652,700 | 3/1987 | Matthews et al. | 379/100 X |
| 4,652,933 | 3/1987 | Koshiishi | 358/257 X |
| 4,658,417 | 4/1987 | Hashimoto et al. | 379/100 X |
| 4,672,459 | 6/1987 | Kudo | 358/257 |
| 4,694,352 | 9/1987 | Ina et al. | 358/257 X |
| 4,748,662 | 5/1988 | Hirata | 379/100 X |
| 4,788,714 | 11/1988 | Hashimoto | |

FOREIGN PATENT DOCUMENTS 60-105367 6/1985 Japan ................... 379/100

OTHER PUBLICATIONS

Audiobionics, Eden Prairie, Minn., "Lifestyle Personal Communicator" (Advertisement), published 3/25/85.
"Der Fernsprecher als Endgeraet in einem Bestellsystem", in *Informatione Ferrsprech-Vermittlungstechnik*, 6 (1970), Heft 3/4 (with partial English translation).
"Das Bildschirmtelefon BITEL T3210" in *Blickpunkt Technik Telecom Report*, 6 (1983), Heft 2 (with partial English translation).

Primary Examiner—Jin F. Ng
Assistant Examiner—Wing F. Chan
Attorney, Agent, or Firm—Fitzpatrick, Cella, Harper & Scinto

[57] ABSTRACT

A communication apparatus which communicate image data, processes character data, and detecting a calling signal from a destination. The image data and the character data are then output. Preferably, characters added to the character data are recorded in response to the calling signal.

13 Claims, 18 Drawing Sheets

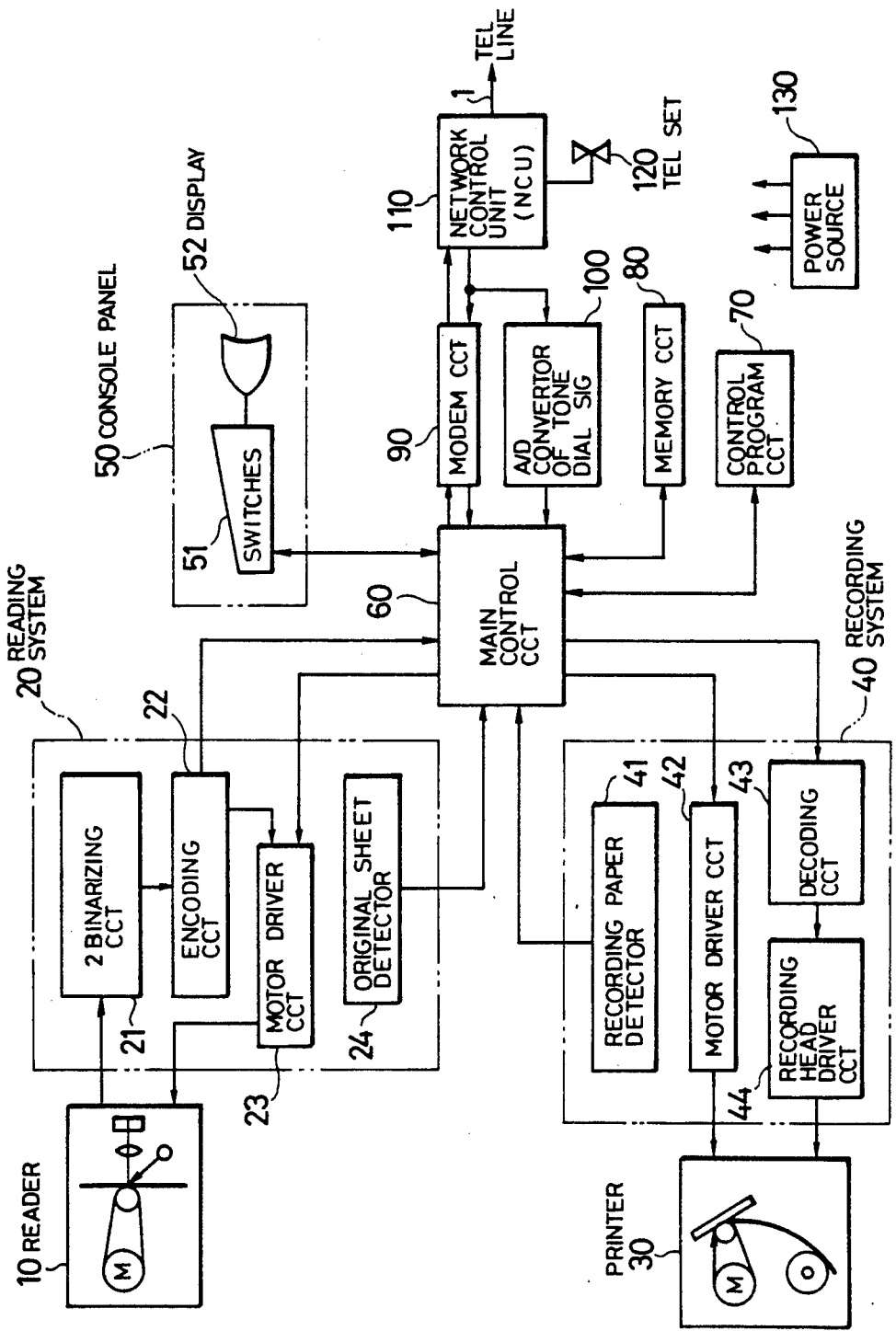

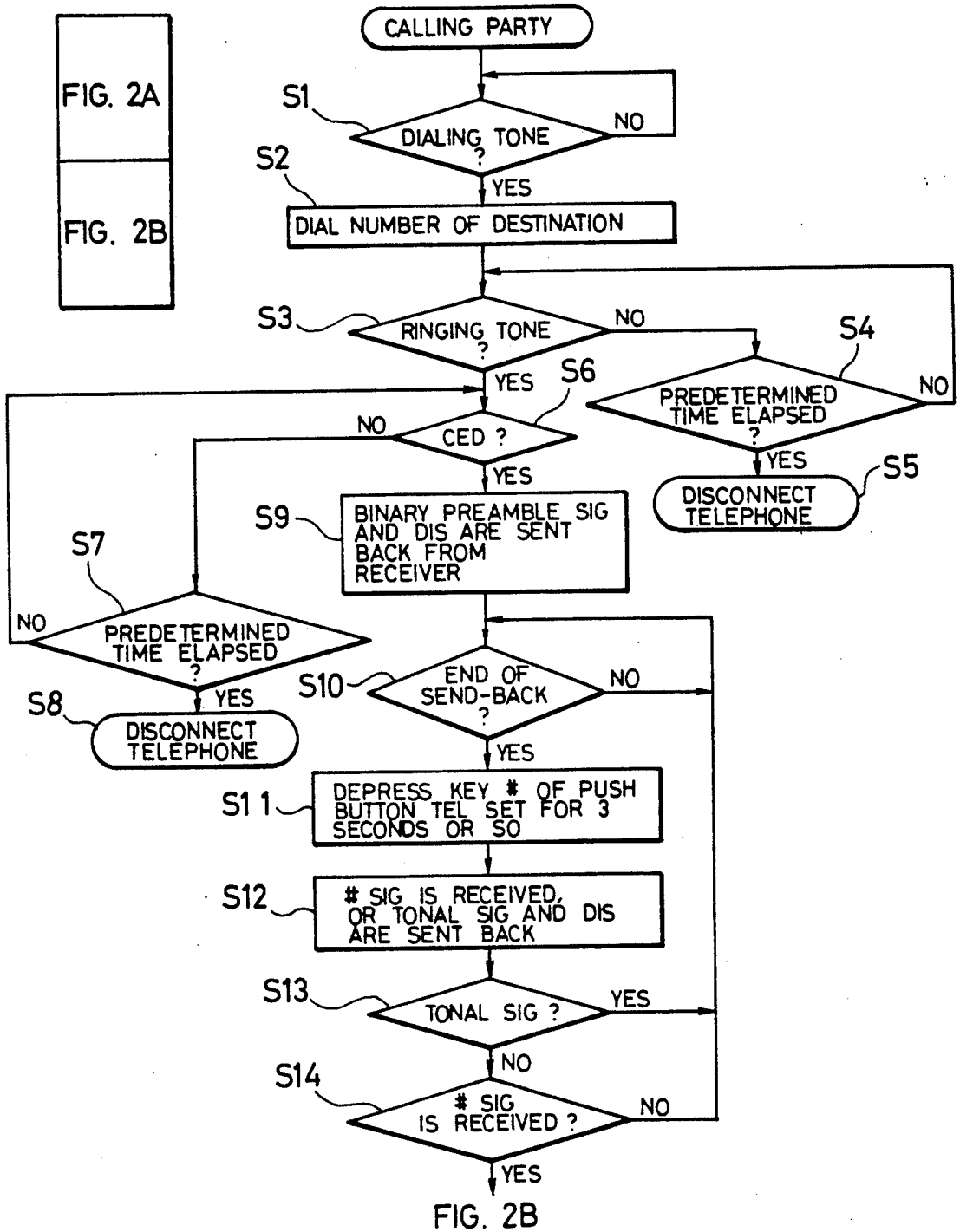

FIG. 5

CODE TABLE

|   | 1 | 2 | 3 | 4 | 5 | 6 | 7 | 8 | 9 | 0 |
|---|---|---|---|---|---|---|---|---|---|---|
| 1 | 1 |   | ア | サ | ナ | マ | ラ | ( |   |   |
| 2 | 2 |   | イ | シ | ニ | ミ | リ | ) |   |   |
| 3 | 3 |   | ウ | ス | ヌ | ム | ル | / |   |   |
| 4 | 4 |   | エ | セ | ネ | メ | レ | + |   |   |
| 5 | 5 |   | オ | ソ | ノ | モ | ロ | − |   |   |
| 6 | 6 |   | カ | タ | ハ | ヤ | ワ |   |   |   |
| 7 | 7 |   | キ | チ | ヒ |   | ン |   |   |   |
| 8 | 8 |   | ク | ツ | フ | ユ | ゛ |   |   |   |
| 9 | 9 |   | ケ | テ | ヘ |   | ゜ |   |   |   |
| 0 | 0 | SPACE | コ | ト | ホ | ヨ | 。 |   |   |   |

COMMUNICATION APPARATUS

This application is a continuation of application Ser. No. 881,802 filed July 3, 1986, now abandoned.

BACKGROUND OF THE INVENTION

1. Field of the Invention

The present invention relates to a communication apparatus.

2. Related Background Art

Recently, various manners of communication have been carried out through telephone lines. Examples are image data communication by a facsimile machine and text data communication by a telex machine. While those machines are connected to a telephone line, communication is not established between different types of devices such as between a telephone set and a facsimile machine, or between a telephone set and a telex machine.

SUMMARY OF THE INVENTION

It is an object of the present invention to provide an improved communication apparatus.

It is another object of the present invention to eliminate the problem encountered in the prior art apparatus.

It is another object of the present invention to enable communication between different types of communication apparatus.

It is another object of the present invention to enable communication between a telephone set and a data communication apparatus.

It is another object of the present invention to provide a data communication apparatus which can be operated by a ten-key pad of a telephone set.

It is another object of the present invention to provide a communication apparatus which can operate another communication apparatus by means of calling keys.

It is another object of the present invention to provide a data communication apparatus which can communicate data by means of calling keys.

It is another object of the present invention to provide a data communication apparatus which can receive data formed by calling keys.

It is another object of the present invention to provide a recorder which prints out fixed information in accordance with a dialing signal from a telephone set.

Other objects and advantages of the present invention will be apparent from the following description of the preferred embodiments.

BRIEF DESCRIPTION OF THE DRAWINGS

FIG. 1 is a block diagram of a first embodiment of the present invention,

FIG. 5 shows a character-code table for converting characters to codes in the first embodiment.

DETAILED DESCRIPTION OF THE PREFERRED EMBODIMENTS

Figure 2B:
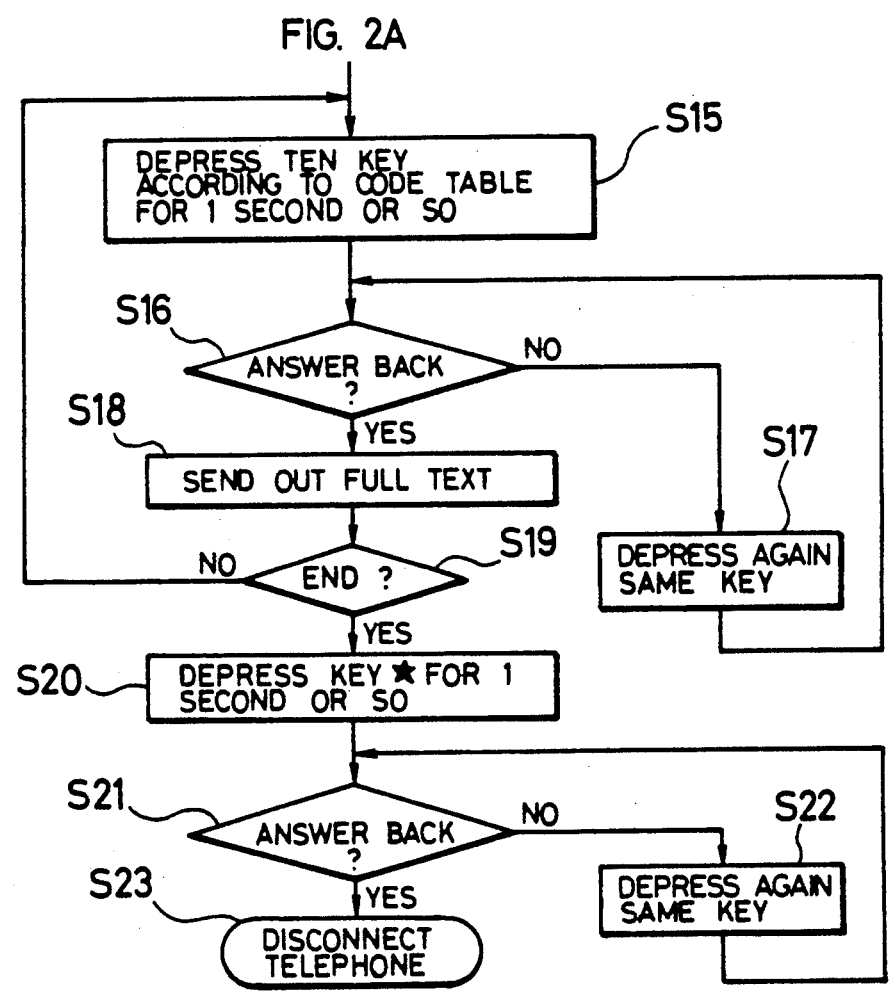
FIG. 2, consisting of FIGS. 2A and 2B, is a flow chart of an operation of a calling station in the first embodiment.

In a first embodiment, data is transmitted by a dialing signal of a telephone set and the transmitted data is printed out by a data communication apparatus.

FIG. 1 shows a block diagram of the first embodiment.

A telephone line 1 is connected to a main control circuit 60 through a network control circuit 110, a modem 90 and a tone/dial signal A/D (analog/digital) converter 100.

The main control circuit 60 centrally controls an overall system and is connected to an image signal processing unit comprising a read unit (or reading system) 20 and a record unit (or recording system) 40. The main control circuit 60 is connected to a console panel 50 including a key switch 51 operated by an operator and a display 52 for displaying a status of the switch 51 and a status of the apparatus. The main control circuit 60 is further connected to a control program circuit 70 which contains a control program for the main control circuit 60 (usually in a ROM).

A data memory 80 stores communication data, coded information sent from a push-button tone-providing type telephone set (hereinafter, "push-phone telephone set") and record data (data to be recorded) converted from the code by a character generator.

The tone/dial signal A/D converter 100 discriminates signals input by 0-9 numeric keys, a # key and a * key represented by a multi-frequency signal sent from the push-phone telephone set and converts the input signals to digital signals. The converter 100 thus converts the input signal to a signal which can be readily processed by the main control circuit 60.

A reader 10, a printer 30, a telephone set 120 and a power supply circuit 130 which supplies voltage to respective blocks are provided.

The read unit 20 comprises a binarizing circuit 21, an encoder 22, a motor driver 23 and a document detector 24. The record unit 40 comprises a record sheet detector 41, a motor driver 42, an encoder 43 and a recording head driver 44.

The operation of the first embodiment is now explained.

FIG. 2 shows a flow chart of an operation in a calling station.

An operator in the calling station picks up a handset and listens to a dial tone (S1), and if the line is ready, he/she dials a destination telephone number (S2). He/she checks if he/she hears a ringing tone (S3). If he/she cannot hear the ringing tone in a predetermined time period (S4), he/she hangs up the handset (or disconnects the telephone) (S5) and redials the destination telephone number.

If he/she hears the ringing tone, he/she checks if he/she hears a facsimile response signal tone (CED), (S6), and if he/she cannot hear it in a predetermined time period (S7), he/she hangs up the handset (S8) and redials.

If the ringing tone and the CED are generated, a preamble signal and a DIS signal are sent from a receiver (S9). After those signals have been sent, the receiver detects a signal which is sent by a transmitter for three seconds. The operator depresses the # key of the push-phone telephone set for this three-second period (S11). If the receiver detects the # key signal, it determines that a call has been made from a terminal other than a facsimile machine and that it has received a start signal (S12).

If the receiver detects the above after the # key of the telephone set has been depressed (S14), the receiver sends a response signal "pee (beep), pee". If the receiver does not detect the above, a tonal signal is sent (only when a GII function is provided) (S13) and then the binary preamble signal and the DIS signal are sent.

If the operator can no longer hear those signals, he/she again depresses the # key. If the response signal which indicates that the # key signal has been discriminated is generated, a document text is converted to codes (S15-S23).

Conversion of a text to codes in accordance with a code table shown in FIG. 5 is now explained.

A code consists of two digits. The first digit is the row in the table and the second digit is the column.

When a text is converted to codes for transmission, numerals of the converted codes are entered digit by digit by using a ten-key pad of the push-phone telephone set (S15). The operator depresses keys of the ten-key pad after he/she hears a response signal (for example, "pee, pee, pee") which indicates the reception of the previous digit (S16, S17).

After the whole text has been sent (S18, S19), the operator depresses the * key (end signal) (S20), and repeatedly depresses the * key until he/she hears the response signal (S21, S22). If he/she hears the response signal in a predetermined time period, he/she hangs up the handset (S23). A code in a blank column of the code table is a space code.

Figure 3:
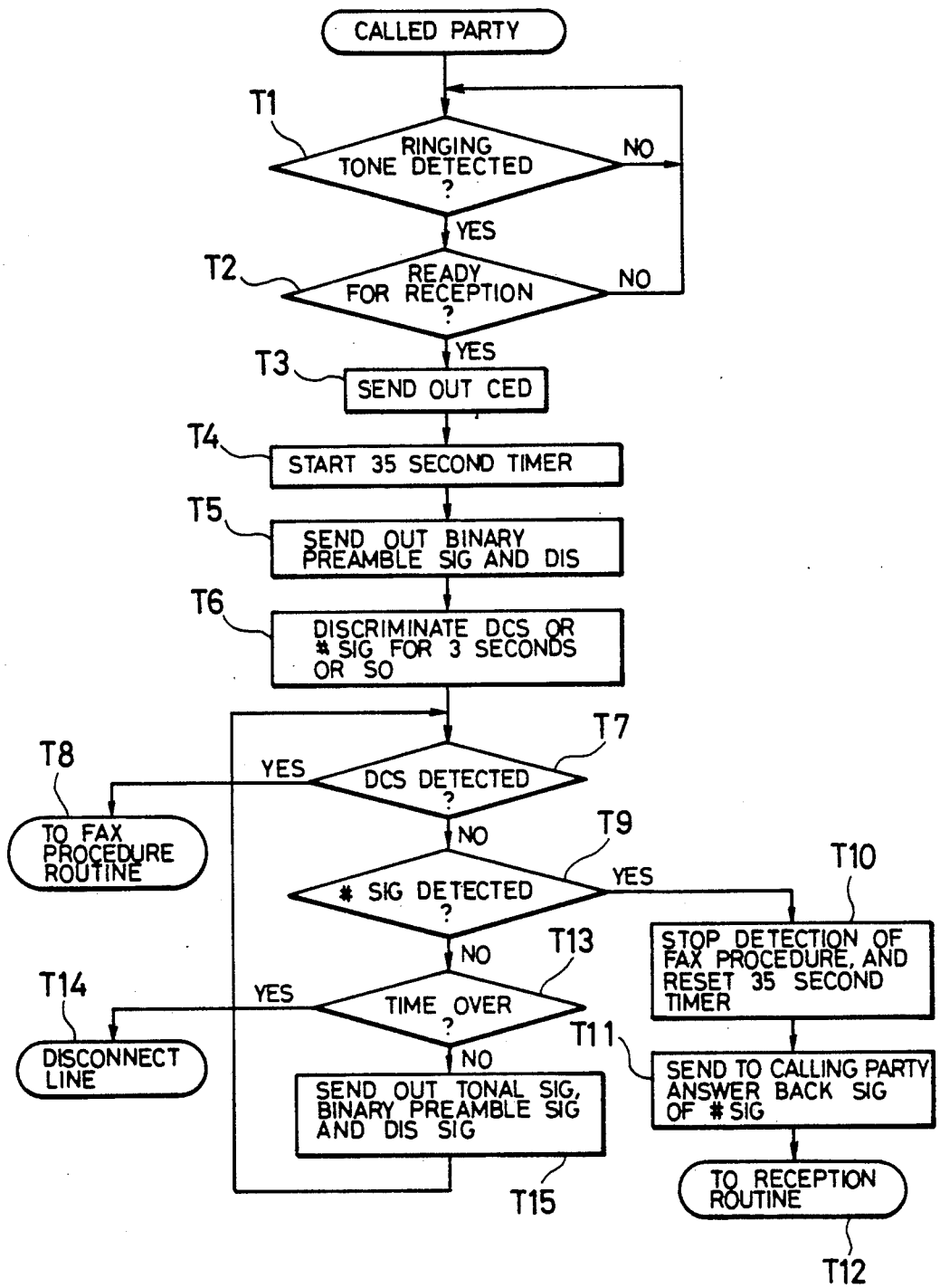
FIG. 3 is a flow chart of an operation of a data communication apparatus of a called station in the first embodiment.

FIG. 3 shows a flow chart of operation in a called station.

The called station first detects the ringing tone (T1) and check whether the station is ready for reception (read sheets are in a stack) or not (T2). If it is ready, the called station send the response signal (CED) (T3). A 35-second timer which is specified by the CCITT specification is started.

Following to the response signal, the binary preamble signal and the DIS signal are sent (T5). For approximately three seconds from the transmission of those signals, a signal sent from the calling station is detected (T6). If the DCS signal is detected (T7), the process proceeds to a FAX procedure routine (T8), and if the DCS signal is not detected, the tonal signal (only when the GII function is provided), the binary preamble signal and the DIS signal are sent out.

When those signals and the # key signal have been detected (T9), the detection of the FAX procedure is stopped and the 35-second timer is reset (T10). Three seconds after the signal transmission from the calling station, the response signal indicating the detection of the # key signal is sent to the calling station (T11), and the process proceeds to a receive routine (T12).

If the DCS signal and the # key signal are not detected in the 35-second period (T13), the called station turns off the line (T14) automatically to open the line If the 35-second period has not been elapsed, the tonal signal, binary preamble signal and DIS signal are sent (T15), and the process returns to T7.

Figure 4:
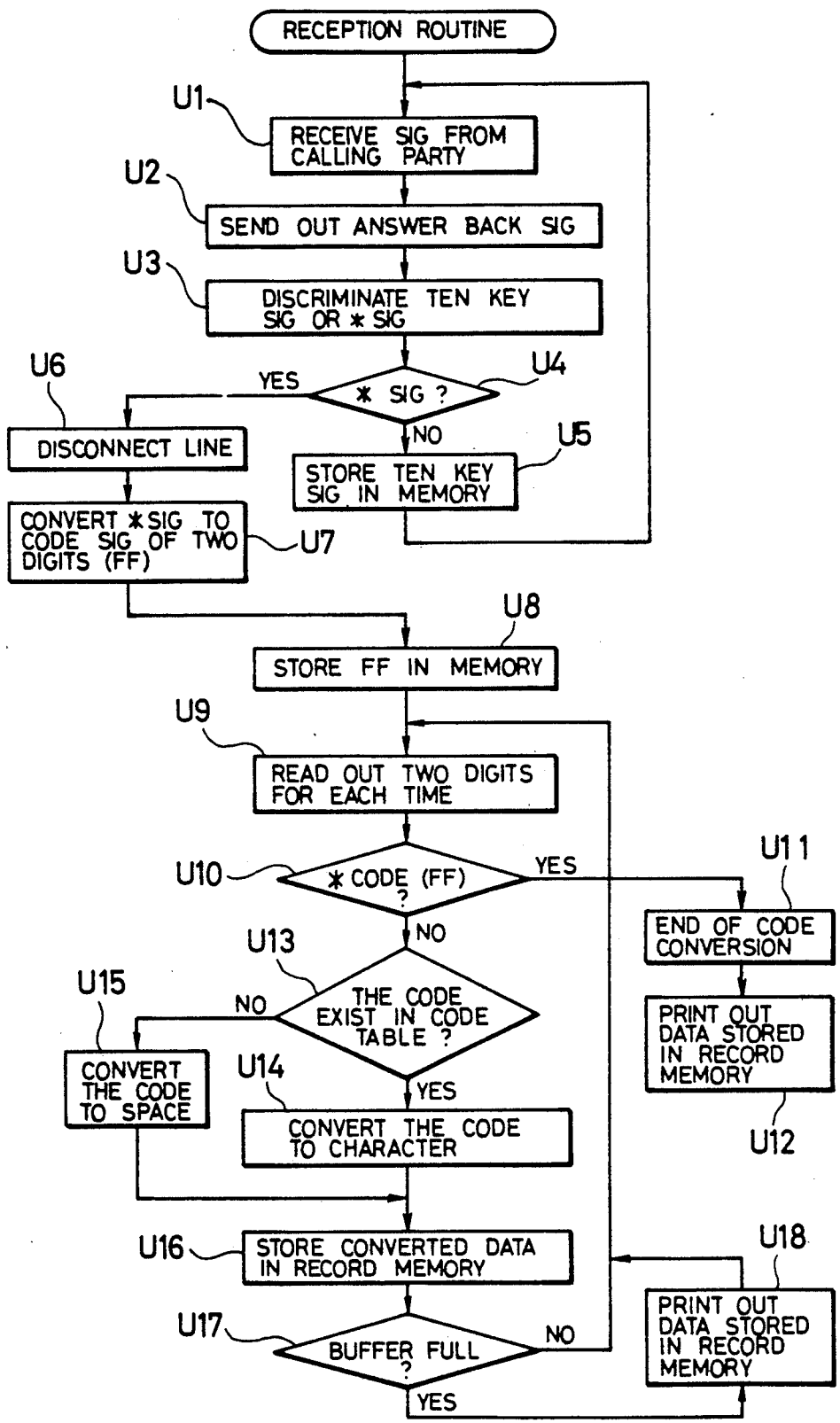
FIG. 4 is a flow chart of a receiving routine of the calling station in the first embodiment.

FIG. 4 is a flow chart of the receive routine in the present embodiment.

In the receive routine, whenever the signal is received from the calling station (U1), the response signal is sent (U2) and discrimination between the 0-9 ten-key signals and the * key signal (U3, U4). When the ten-key signal is received, it is stored in the memory circuit (U5) and then the signal from the calling station is further received (U1).

If the * key signal is detected, the line is turned off (U6), and the * key signal is converted to a two-digit code FF (U7) which is stored in the memory (U8).

The codes are read out of the memory, two digits at a time (U9), to check whether the code being read out is the FF code (* key) or not (U10). If it is the FF code, the code conversion is terminated (U11) and the data in the record memory is printed out (U12).

If it is not the FF code (* key), it is converted to a character data by referencing the code table (U14). and the character data is stored in the record memory (U16). If the code read out is not in the code table (U13), it is converted to a space (U15) and stored in the record memory.

If the buffer becomes full or the FF code is detected during the repetition of the above operation (U17), the data is read out of the record memory and printed out (U18). Thus, a message is formed.

In the data communication apparatus of the first embodiment, each time the dial signal of the ten-key pad of the telephone set is received, the acknowledge signal is sent to the telephone set. Alternatively, each time the two-digit dial signal (this term being used to denote a two-digit or similar code signal sent by e.g., activating button(s) of a push-phone telephone set) is received, the two-digit dial signal may be converted to characters and a tonal signal representing the converted characters may be sent to the telephone set instead of the mere acknowledge signal. To this end, a voice circuit which generates fifty voice signals is provided so that the voice signals corresponding to the recognized characters are sent to the telephone set. As a further alternative, all of the two-digit code signals may be received and converted to characters and then voice data representing the received text may be sent to the telephone set.

In accordance with the first embodiment, the recorder is operated in accordance with the two-digit dial signal so that the data can be transmitted from the conventional telephone set.

In the first embodiment, the characters to be printed are sequentially entered by means of the ten-key pad of the telephone set. This takes time in entering the characters. Frequently used texts may be registered in the recorder as fixed information, and one of the registered fixed information may be specified by a code signal of the telephone set to print it out. An embodiment therefor is explained below.

Figure 6:
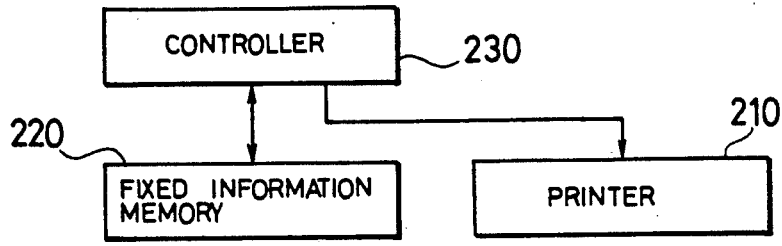
FIG. 6 is a block diagram of a basic configuration of a second embodiment.

FIG. 6 shows a block diagram of a basic configuration of the second embodiment.

In FIG. 6, print means 210, fixed information memory means 220 and control means 230 are provided.

The print means 210 may be a conventional printer of any type. The fixed information memory means 220 stores a plurality of fixed sets of information to be used as memos.

Figure 7:
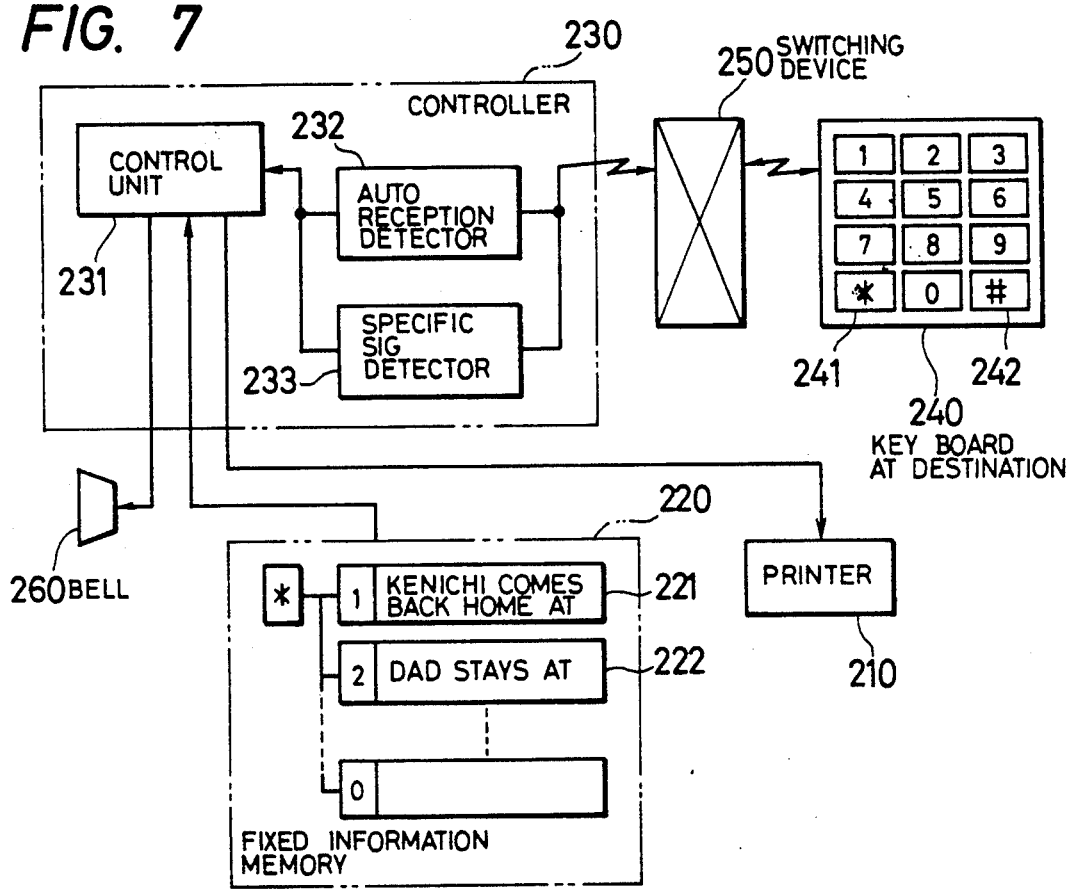
FIG. 7 is a block diagram of a detail of the second embodiment.

Control means 230 reads the fixed information corresponding to a specific signal received from the partner station, out of the plurality of fixed information and causes the print means 210 to print the read fixed information FIG. 7 shows a detailed block diagram of the second embodiment. The control means 230 comprises a controller 231, an auto-reception detector 232 for detecting an auto-reception signal from the partner apparatus, and a specific signal detector 233 for detecting a specific signal sent from the partner apparatus.

The fixed information memory unit 220 has memories 221, 222, ... for storing information corresponding to the * key and 0-9 keys. For example, for the combination of the * key and the numeric key "1", character information for "Kenichi comes back home at" is stored, and for the combination of the * key and the numeric key "2", character information of "Dad stays at" is stored.

A partner station keyboard 240 is a push-phone telephone set keyboard in the partner apparatus. The keyboard 240 has ten keys "0"-"9", a * key 41 and a # key 42.

A switching device 250 and a bell 260 which informs of reception of a speech selection signal from the partner apparatus are provided. The switching device 250 may be a one used for a conventional telephone line.

The * key 241 in the keyboard 240 is used to send out the specific signal, and the # key 242 is used to send out the speech selection signal.

Figure 9:
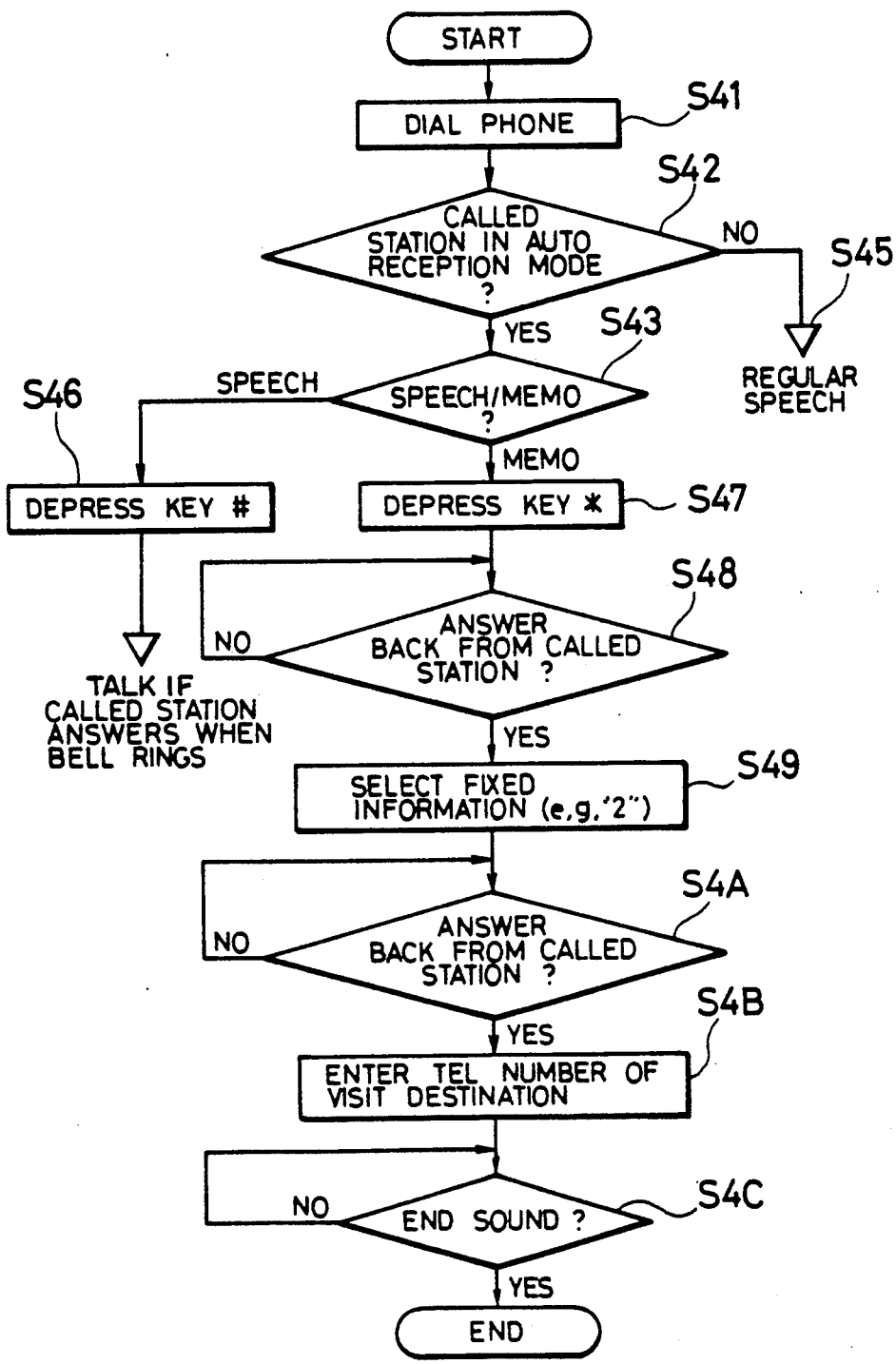
FIG. 9 is a flow chart of an operation of a destination station in the second embodiment.

The operation of the second embodiment is now explained. FIG. 9 shows a flow chart of an operation to be performed by an operator in the calling station.

The operator first dials a telephone (S41). He/she dials through the keyboard 240. The operator checks whether the communication apparatus of the destination station is set in the above-receive mode or the manual receive mode (S42). If it is in the manual receive mode, a conventional telephone processing is carried out (S45).

If the operator needs speech communication (S43), he/she depresses the # key 242 (S46). As a result, an operator in the destination station is called by the bell in the communication apparatus of the destination station and speech communication can be started when the operator in the destination station responds.

On the other hand, if the operator requires a memo in S43, he/she depresses the * key 241 (S47). If he/she hears an answer tone from the destination station (S48), he/she selects a desired fixed information (S49). For example, he/she selects the numeric key "2" of the ten-key of the keyboard 240.

If the operator hears the answer tone (S4A), he/she enters a telephone number by the ten-key of the keyboard 240 (S4B). When an end sound is transmitted (S4C), the series of operations is terminated.

Figure 10:
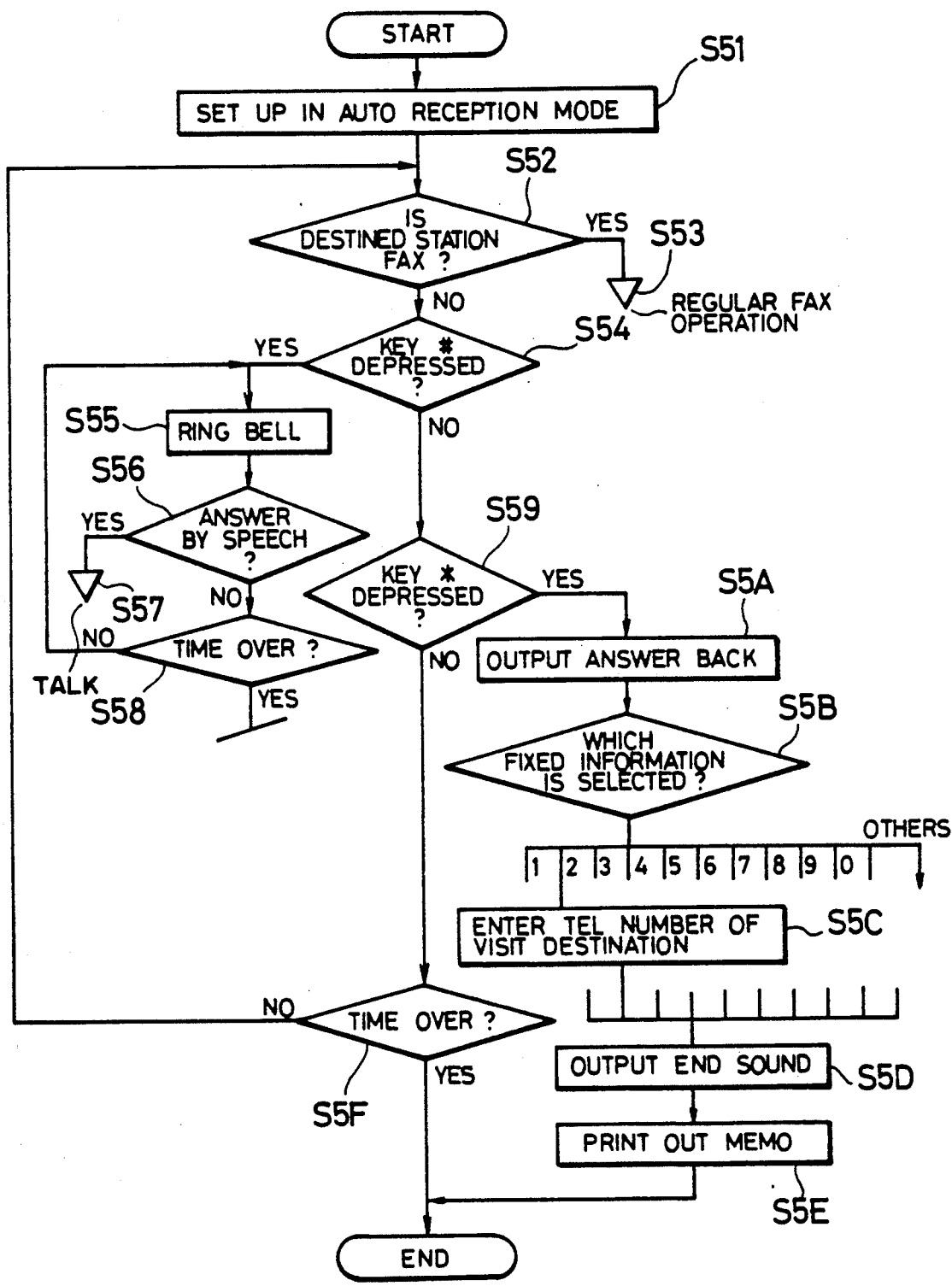
FIG. 10 is a flow chart of an operation of a source station in the second embodiment.

FIG. 10 is a flow chart of the operation of the communication apparatus in the called station.

When the called station receives an auto-receive signal from the calling station, the auto-receive detector 232 of the control means 230 detects the auto-receive signal to start up the apparatus of the called station (S51). If the calling station is a facsimile machine (S52), a regular facsimile operation is carried out (S53).

On the other hand, if the calling station is not a facsimile machine and the specific signal detector 233 detects the speech selection signal generated by the operator of the calling station by depressing the # key 242 of the telephone set, the bell 260 is rung (S55), and if the operator in the called station responds by speech (S56), the speech communication is performed. If the speech response is not made, the bell is continuously rung, and after a predetermined time period (S58), the series of operations are terminated.

On the other hand, if the speech selection signal generated by the # key 242 is not detected in S54, a selection signal generated by the operator in the calling station by depressing the * key 241 is checked (S59). If the specific signal detector 233 detects the selection signal generated by the * key 241, an answer tone is sent back (S5A). Then, a desired signal is selected from the plurality of fixed information stored in the fixed information memory 20.

Figure 8:
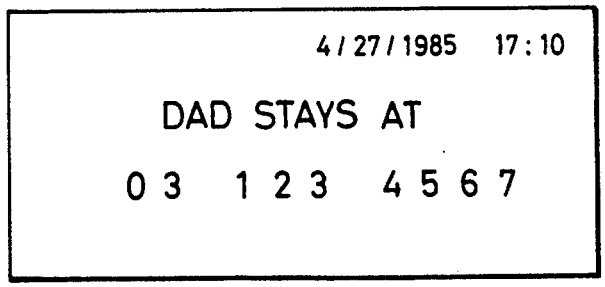
FIG. 8 shows a printout of a memo in the second embodiment.

In the, present case, since the fixed information "2" is selected, the information "Dad stays at" is sent to the print unit 210. In the calling station, the phone number at the stay location, for example "03-123-4567" is entered (S5C). Then, an end sound is sent to the called station (S5D) where the memo is printed out by the printer unit 210 (S5E). An example of the printout is shown in FIG. 8. In S5C, the phone number is entered by means the ten-key pad of the apparatus in the calling station.

In the second embodiment, the phone number shown in FIG. 8 is inputted as a variable information.

In the second embodiment, the push-phone data (tone signal) by the # key 242 is used. Alternatively, a dialing signal (pulse signal) may be used. In the present embodiment, after the answer tone or end sound has been sent, the input data may be repeatedly sounded by a speech synthesizer IC so that a more effective service is provided. The fixed information stored in the fixed information memory unit 220 may be set by the user.

In the second embodiment, if the communication apparatus has the printer means, a message can be recorded while no one is in the office or home.

In the first and second embodiments, data is transmitted from the telephone set to the data communication apparatus. Alternatively, a calling key such as a ten-key or one-touch key may be provided in the data communication apparatus to activate the data communication apparatus of the other station ·

In a third embodiment, data is transmitted by the call key of the data communication apparatus. In the third embodiment, a facsimile machine for image data communication is used.

Figure 11:
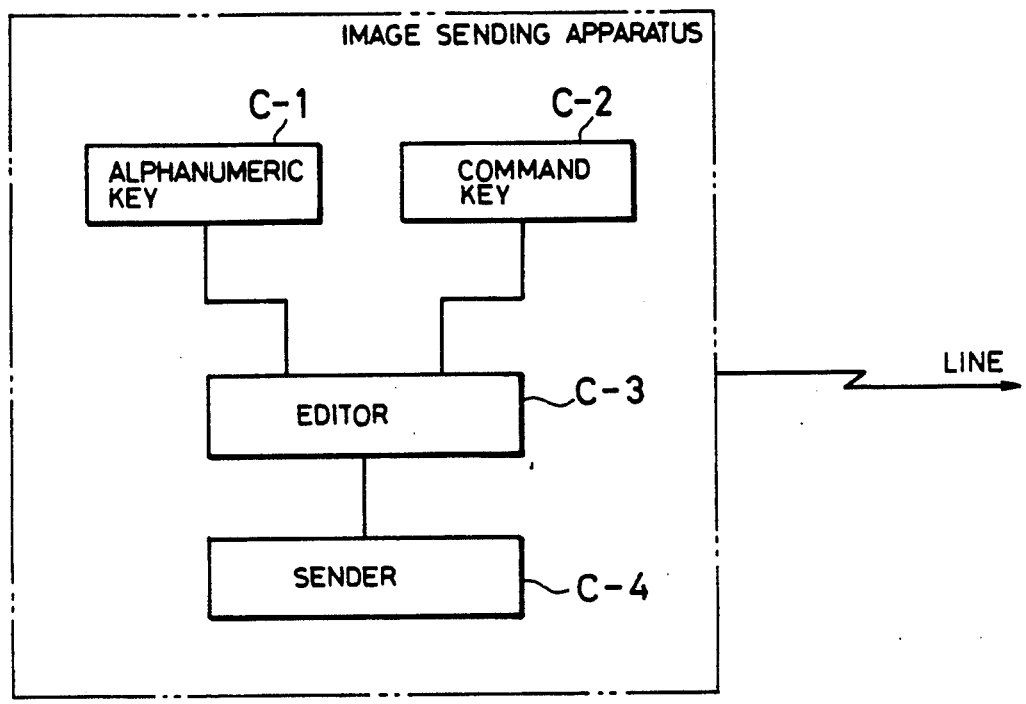
FIG. 11 is a block diagram of a basic configuration of a third embodiment.

FIG. 11 shows a block diagram of a basic configuration of the third embodiment. As shown in FIG. 11, the third embodiment comprises an alphanumeric key C-1, a command key C-2 for editing a text, a text editor C-3 for generating a character sequence signal in response to the depression of the alphanumeric key C-1 and the command key C-2, and a sender C-4 for serially sending the character sequence signal generated by the text editor C-3.

Figure 12:
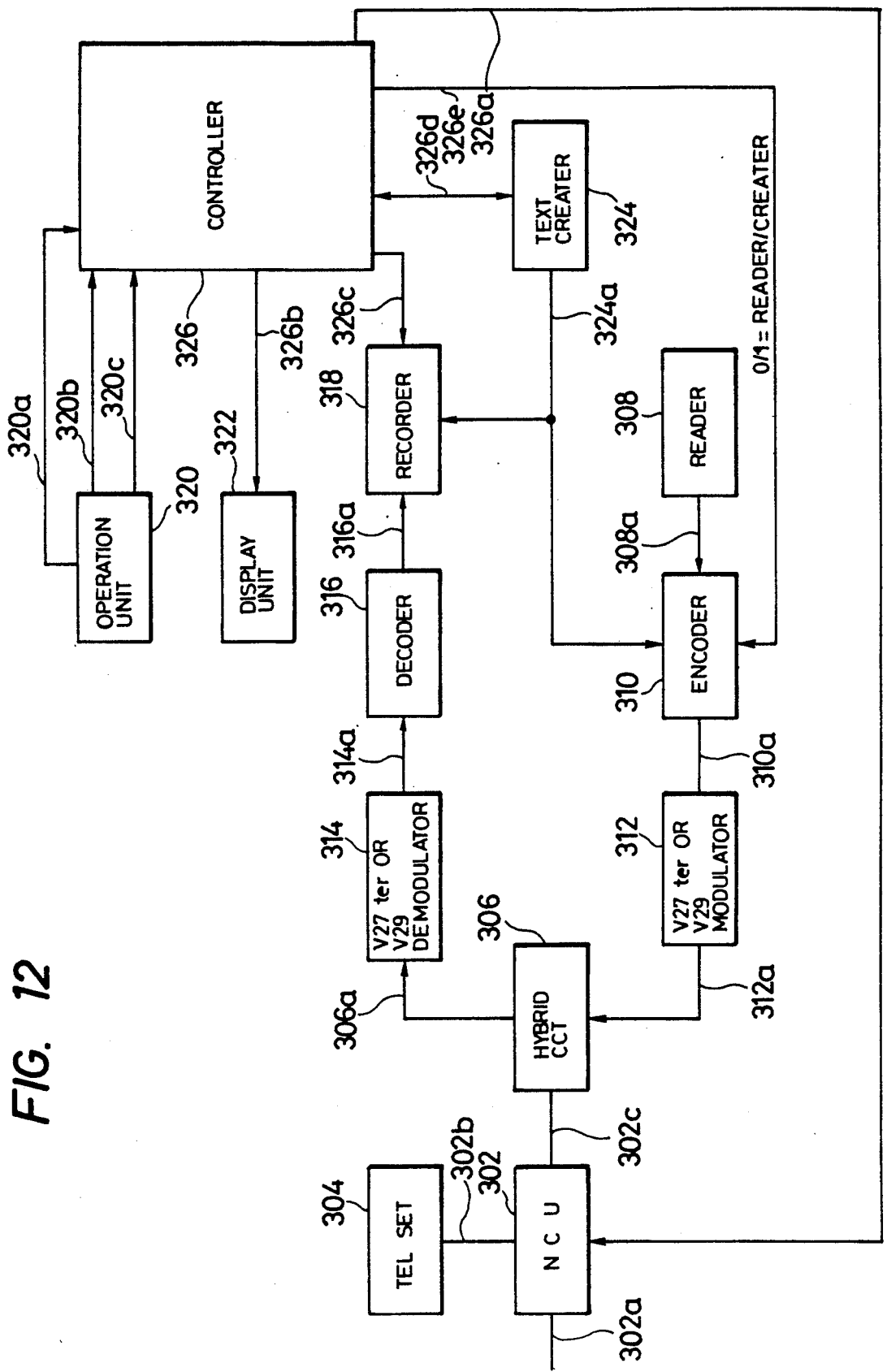
FIG. 12 is a block diagram of a detail of the third embodiment.

FIG. 12 shows a detailed block diagram of the third embodiment.

In FIG. 12, numeral 302 denotes a network control unit (NCU) for controlling connection of a telephone switching network by connecting the network to a terminal for use in data communication and holding a loop by switching a data communication path. A signal line 302a is a telephone line. The NCU 302 receives a signal on a signal line 326a, and if a signal level thereof is "0", it connects the telephone line to the telephone set. (The signal line 302a is connected to the signal line 302b.) If the signal on the line 326a is "1", the NCU 302 connects the telephone line to the facsimile machine. (The signal line 302a is connected to the signal line 302c.) In a normal state, the telephone line is connected to the telephone set.

Numeral 304 denotes the telephone set. Numeral 306 denotes a hybrid circuit for separating a transmission signal from a receiving signal. The transmission signal on the signal line 312a is sent out to the telephone line through the signal line 302c and the NCU 302. The signal sent from the other station is supplied to the signal line 306a through the NCU 302 and the signal line 302c.

Numeral 308 denotes a read circuit, which sequentially reads one-line image signals in a main scan direction from a transmitted text to generate a binary (black and white) signal sequence. The read circuit 308 includes an imaging element such as a charge coupled device (CCD) and an optical system. The black-and-white binary signal sequence is supplied to the signal line 308a.

Numeral 310 denotes an encoder which receives a signal on a signal line 326e, and when the signal level thereof is "0", it receives the binary data on the signal line 308a. When the signal level on the signal line 326e is "1", the encoder 310 receives the binary data on the signal line 324a supplied from the text editor 324. The input data is encoded (modified Huffman code (MH) or modified READ (MR) code) and the encoded data is supplied to the signal line 310a.

Numeral 312 denotes a modulator which modulates in accordance with the CCITT recommendation V27 ter (differential phase modulation) or V29 (orthogonal modulation). The modulator 312 receives the signal on the signal line 310a, modulates it and supplies the modulated data to the signal line 312a.

Numeral 314 denotes a demodulator which demodulates in accordance with the CCITT Recommendation V27 ter (differential phase modulation) or V29 (orthogonal modulation). The demodulator 314 receives the signal on the signal line 306a, demodulates it and supplies the demodulated data to the signal line 314a.

Numeral 316 denotes a decoder which receives the demodulated data on the signal line 314a and supplies the decoded data (MH-decoded or MR-decoded) to the signal line 316a.

Numeral 318 denotes a recorder which receives the demodulated data (on the signal line 316a) and sequentially record it one black-and-white line at a time. When a pulse is supplied on the signal line 326c, the recorder 318 receives the signal on the signal line 324a and sequentially records it one black-and-white line at a time. Namely, the text generated by the ten-key and alphabetic keys is recorded.

Numeral 320 denotes a console unit. When alphabetic keys A–Z of the console unit are depressed, signals are sent to the signal line 320a. When numeric keys 0–9 and * key and # key are depressed, signals are sent to the signal line 320b. When a start key, a text send key, a mode set key or a cursor move key is depressed, a signal is sent to the signal line 320c. The function of those keys will be explained later.

Numeral 322 denotes a display which displays ten characters on the left and right of a cursor. The ten-character information on the left and right of the cursor is sent to the signal line 326b.

Numeral 324 denotes a text editor (or creater) which creates and edits a text as the alphabetic keys and the ten-key are depressed. The created text is supplied to the signal line 324a as the black-and-white binary signal sequence.

Numeral 326 denotes a control circuit for controlling the above operations. The text generation by the console unit 320 is now explained.

An operator first depresses the mode select key and then the numeric key "1" to select the text generation mode. Then, he/she creates a text by using the ten-key pad, alphabet keys, * key (which functions as a space key), # key (which functions as a return key) and cursor move key. The ten-character information on the left and right of the cursor is sent to the signal line 326b and is displayed on the display 322. When the text generation is completed, the operator again depresses the mode select key. The created text is stored in the text editor 324. When the created text is to be recorded by the recorder 318, the operator depresses the "W" key after the mode select key.

On the other hand, if the coded text is to be transmitted to another station, the operator depresses the text send key after the line has been connected. In an auto send mode, the auto-send procedure is sent by the one-touch key or a preset dialing key and then the operator depresses the text send key. Thus, the text is transmitted to the destination station which automatically called.

Figure 13:
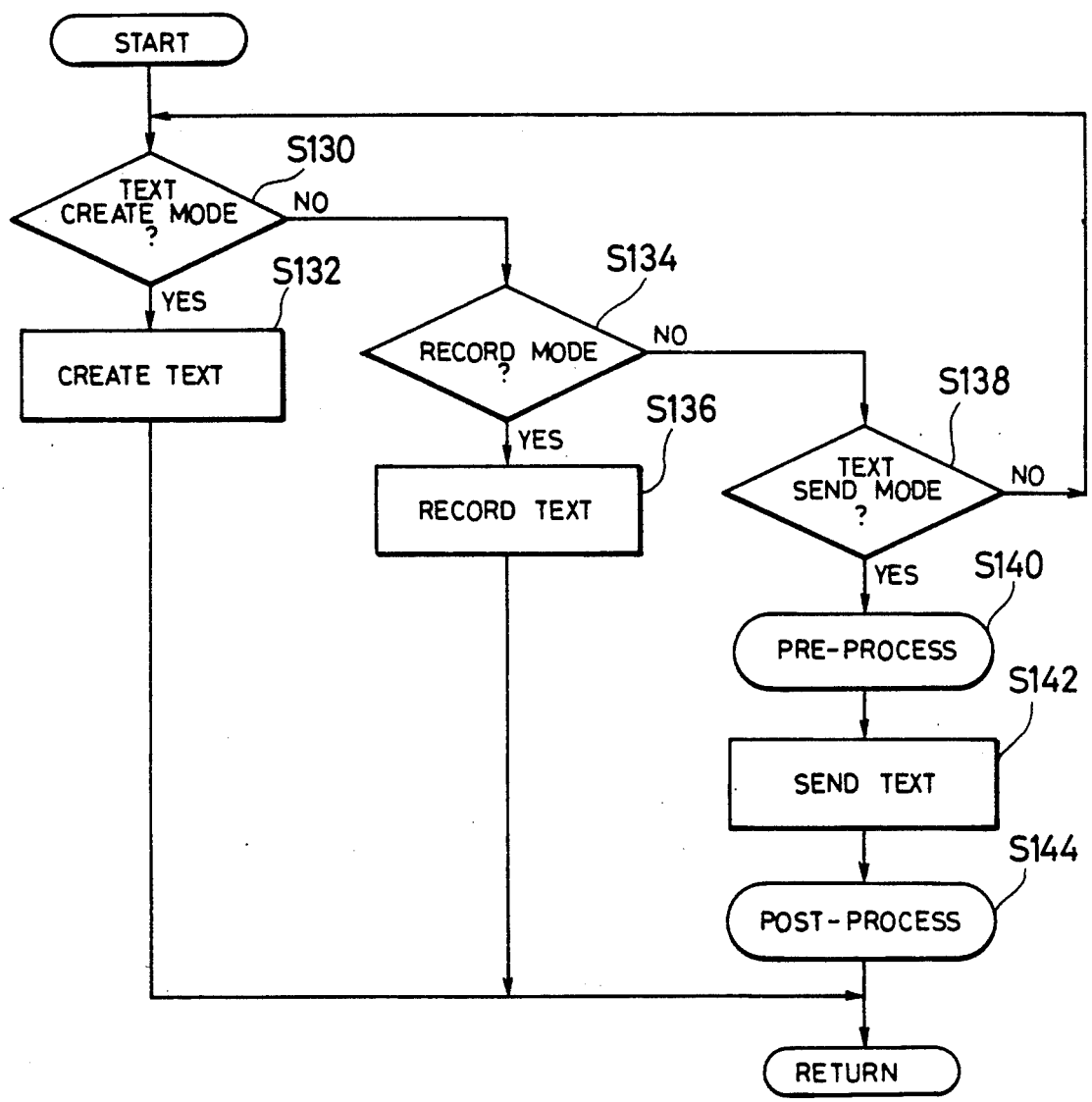
FIG. 13 is a flow chart of a control operation of a control circuit 26 in the third embodiment.

FIG. 13 is a flow chart of a control procedure to be executed by the control circuit 326 of FIG. 12.

In FIG. 13, a "0" level signal is initially sent to the signal line 326a and the telephone line is connected to the telephone set. A "0" level signal is sent to the signal line 326e so that the information read from the document is transmitted.

In a step S130, whether the text generation mode has been selected or not, that is, whether the mode selection key and the numeric key "1" have been sequentially depressed or not is checked (by signals on the signal lines 320b and 320c). If the text generation mode has been selected, that is, if the mode selection key and the numeric key "1" have been sequentially depressed, the process proceeds to a step S132. On the other hand, if the text generation mode has not been selected, that is, if the mode selection key and the numeric key "1" have not been sequentially depressed, the process proceeds to a step S134.

In the step S132, a text is generated by depressing the ten-key, alphabet keys, * key and # key on the console unit. The key inputs are discriminated by signals on the signal lines 320a, 320b and 320c. The text is generated in the text generator 324 through the signal line 326d. The ten-character information on the left and right of the cursor is sent to the signal line 326b. When the mode selection key is again depressed, the generation of the text is terminated.

In the step S134, whether the text record mode has been selected or not, that is, whether the mode selection key and the "W" key have been sequentially depressed or not, is checked (by means of the signals on the signal lines 320a and 320c). If the text record mode has been selected, that is, when the mode selection key and the "W" key have been sequentially depressed, the process proceeds to a step S136. On the other hand, if the text record mode has not been selected, that is, if the mode selection key and the "W" key have not been sequentially depressed, the process proceeds to a step S138.

In the step S136, the generated text is recorded by sending the pulse signal to the signal line 326c.

In the step S138, whether a text send mode has been selected or not, that is, whether the text send key has been depressed or not is checked (by the signal on the signal line 320c). If the &ext send mode has been selected, that is, if the text send key has been depressed, the process proceeds to a step S140. If the text send mode has not been selected, that is, if the text send key has not been depressed, the process proceeds to &he step S130.

When the process proceeds to the step S140, a "1" level signal is sent to the signal line 326a and the telephone line is connected to the facsimile machine.

The step S140 is a pre-procedure (or pre-process). In a step S142, the text is transmitted. Before the image is transmitted, a "1" level signal is sent to the signal line 326e to encode the signal supplied from the text generator 324. When the text transmission is completed, a "0" level signal is sent to the signal line 326e to transmit the information read from the document.

In the step S144, the post procedure of the CCITT Recommendation is carried out. When the post procedure has been completed, a "0" level signal is sent to the signal line 326a to connect the telephone line to the telephone set.

When the text transmission mode is selected during the transmission of the image information (step S138), the text is transmitted (step S142) without the pre-procedure (step S140) after the image information has been transmitted.

The text may be generated during the transmission of the image information, and the text send key may be depressed to transmit the text generated after the transmission of the image information.

In accordance with the third embodiment, a simple text may be sent by keying in it by the console unit without hand-writing it. Since the keys which are normally used to send a call signal are used, the construction is not complex. Since the text can be generated during the transmission of the image information, a general purpose image transmission apparatus is provided.

In the third embodiment, the data is generated by the input keys which are normally used to send a call signal in the facsimile machine. In a fourth embodiment, the input keys of the facsimile machine have a plurality of functions.

Figure 14:
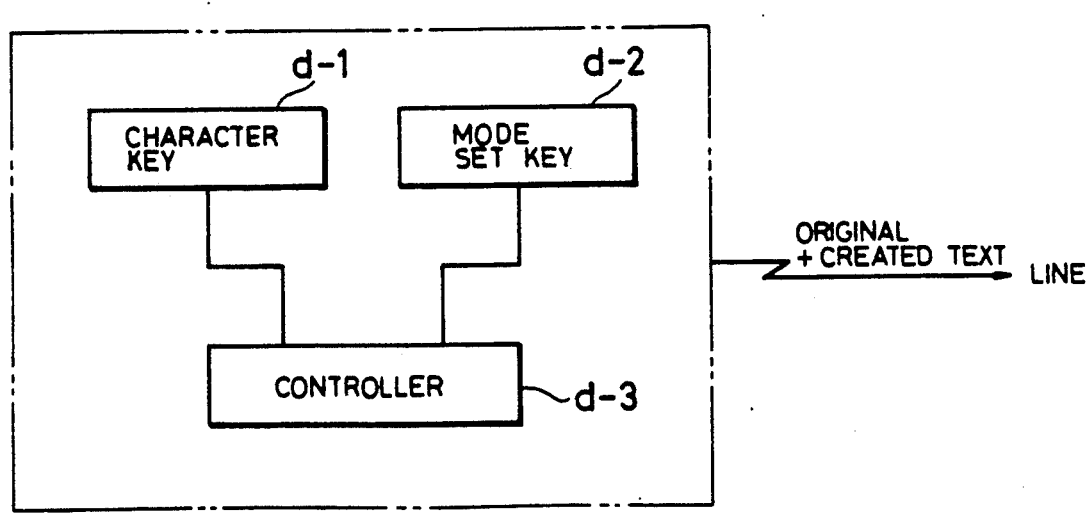
FIG. 14 is a block diagram of a basic configuration of a fourth embodiment.

FIG. 14 is a block diagram of a basic configuration of the fourth embodiment. The fourth embodiment comprises character keys d-1 which include alphabet keys and numeric keys, mode selection keys d-2 and control means for performing one of a plurality of functions such as one-touch dialing function, preset dialing function, source information preparation function and text edit function in accordance with the depression of the mode selection key and the character keys. The character sequence information generated by the depression of the character keys is sent with the document image or separately from the document image.

Figure 15:
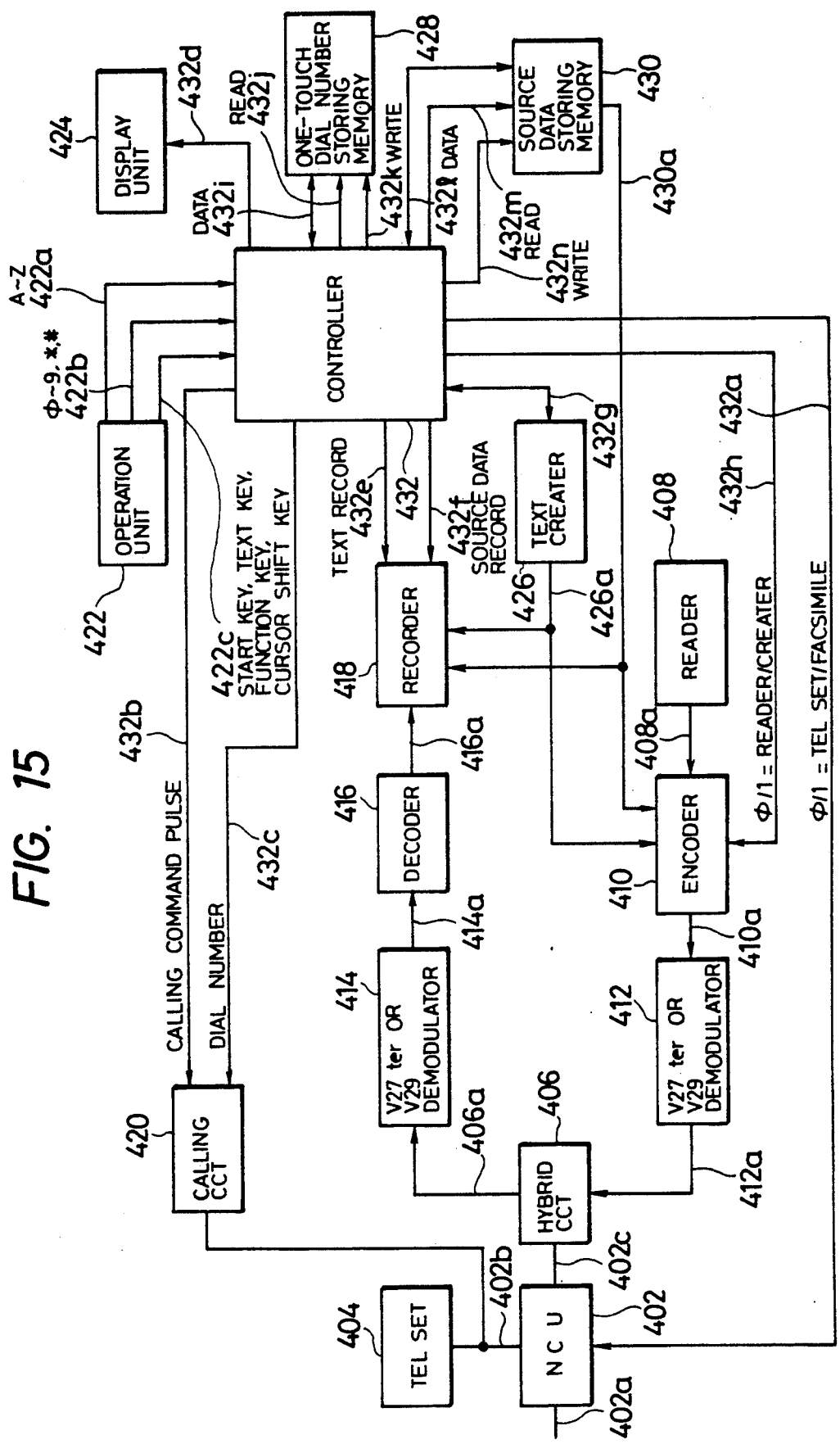
FIG. 15 is a block diagram of a detail of the fourth embodiment.

FIG. 15 shows a detailed block diagram of the fourth embodiment.

In FIG. 15, numeral 402 denotes a network control unit (NCU) for controlling the connection of the telephone switching network to connect the network to a terminal for use in data communication and keeping a loop by switching the data communication path. A signal line 402a is a telephone line. The NCU 402 receives a signal on a signal line 432a, and if a signal level thereof is "0", it connects the telephone line to the telephone set. (The signal line 402a is connected to the signal line 402b.) If the signal on the signal line 432a is "1" level, the NCU 402 connects the telephone line to the facsimile machine. (The signal line 402a is connected to the signal line 402c.) In a normal state, the telephone line is connected to the telephone set. Numeral 404 denotes the telephone set.

Numeral 406 denotes a hybrid circuit which separates a transmission signal from a receiving signal. The transmission signal on the signal line 412a is sent to the telephone line through the signal line 402c and the NCU 402. The signal sent from the other station is sent to the signal line 406a through the NCU 402 and the signal line 402c.

Numeral 408 denotes a read circuit which sequentially reads one-line image signals in a main scan direction from the transmitted document to generate a black-and-white binary signal sequence The read circuit 408 comprises an imaging element such as a charge coupled device (CCD) and an optical system. The black-and-white binary signal sequence is supplied to a signal line 408a.

Numeral 410 denotes an encoder which receives a source information on the signal line 430a and a signal on a signal level of the signal on the signal line 432h is "0", it reads in the binary data on the signal line 408a. When the signal level on the signal line 432h is "1", the encoder 410 reads in the binary data on the signal line 426a supplied from the text generator 426. The input data is encoded (using modified Huffman (MH) code or modified READ (MR) code), and the encoded data is sent to the signal line 410a.

Numeral 412 denotes a modulator which modulates in accordance with the CCITT Recommendation V27 ter (differential phase modulation) or V29 (orthogonal modulation). The modulator 412 receives the signal on the signal line 410a, modulates it and supplies the modulated data to the signal line 412a.

Numeral 414 denotes a demodulator which demodulates in accordance with the CCITT Recommendation V27 ter (differential phase modulation) or V29 (orthogonal modulation). The demodulator 414 receives the signal on the signal line 406a, demodulates it and supplies the demodulated data to the signal line 414a.

Numeral 416 denotes a decoder which receives the demodulated data on the signal line 414a and supplies the decoded data (using MH decoding or MR decoding) to the signal line 416a.

Numeral 418 denotes a recorder which receives the decoded data on the signal line 416a to sequentially record the black-and-white signals one line at a time.

When a pulse is supplied to the signal line 432e, the recorder 418 reads in the text on the signal line 426a to record the black-and-white signals one line at a time. When a pulse is supplied to a signal line 432f, the recorder 418 reads in the source information on the signal line 430a to sequentially record the black-and-white signals one line at a time.

Numeral 420 denotes a calling circuit which reads in a dial number on a signal line 432c when a call pulse is supplied to a signal line 432b.

Numeral 422 denotes a console unit. When alphabet keys A-Z in the console unit are depressed, the corresponding signals are supplied to the signal line 422a. When the numeric keys 0-9 and the * key and # key (not shown) are depressed, the corresponding signals are supplied to the signal line 422b. When the start key, text send key, mode selection key and cursor move key are depressed, the corresponding signals are supplied to the signal line 422c. The functions of those keys will be described later.

Numeral 424 denotes a display which displays ten characters on the left and right of a cursor. The ten-character information on the left and right sides of the cursor is supplied to the signal line 432d.

Numeral 426 denotes a text generator which generates a text through a signal line 432g as the alphabet keys and ten-key are depressed. The generated text is supplied to a signal line 426a as the black-and-white binary signal sequence.

Numeral 428 denotes a battery backed-up memory which stores one-touch dial numbers. When a dial number for a particular alphabet key is to be written, a signal representing the phone number (for example, "1", "2", "3", "4", "3", "2", "1") is supplied to a signal line 432z' following to a signal representing the alphabet key (for example, "A"), and then a write pulse is supplied to a signal line 432k. When a registered dial number is to be read, a signal representing an alphabet (for example, "A") is supplied to the signal line 432i and then a read pulse is supplied to a signal line 432j. Thus, the dial number for example, 123-4321 registered for the alphabet key (for example, "A") is supplied to the signal line 432i.

Numeral 430 denotes a battery backed-up source or caller information memory. When source information is to be stored, the source information is supplied to a signal line 432l and a write pulse is supplied to a signal line 432n. When the stored source information is to be read, a read pulse is supplied to a signal line 432m. Thus, the stored source information is supplied to the signal line 432l.

Numeral 432 denotes a control circuit which controls the operations described below.

First a text is generated by using the console unit 422. An operator depresses the mode selection key and then the numeric key "1" to select the text generation mode. Then, he-she prepares a text by using the ten-key, alphabet keys, * key (which functions as a space key), # key (which functions as a return key) and a cursor move key. Ten-character information on the left and right of the cursor is supplied to the signal line 432d and it is displayed on the display 424. When the text preparation is completed, the operator again depresses the mode selection key. The generated text is stored in the text generator 426. When the generated text is to be recorded by the recorder 418, the operator depresses the "W" key following to the mode selection key.

On the other hand, when the generated text is to be transmitted to other station, the line is connected and the operator depresses the text send key. In an auto-send mode, the operator automatically sends a signal by the one-touch key or preset dial key and then depresses the text send key. Thus, the generated text is transmitted to the automatically called station.

When the source information which is to be added before the image information to be transmitted and transmitted as a non-standard signal, the operator depresses the mode selection key and then the numeric key "4" to select the source information generation mode. Then, he/she generates a title of text or abbreviation by using the ten-key, alphabet key, * key (space key), # key (return key) and cursor move key. The generated source information is stored in the source information memory 430. Ten-character information on the left and right of the cursor is supplied to the signal line 432d and displayed on the display 424. When the preparation of the source information is finished, the operator again depresses the mode selection key and the generated source information is registered.

When the number for the one-touch dial is to be entered, the operator depresses the mode selection key and then the numeric key "5" to select the one-touch dial number enter mode. Then, he/she depresses the alphabet key and numeric keys so that the telephone number for the alphabet is stored in the one-touch dial number memory 428. The * key functions as a space key. For example, the operator depresses "A", "1", "2", "3", "4", "3", "2" and "1". Thus, the dial number 123-4321 is registered for the alphabet "A". After the one-touch dial number has been entered, the operator again depresses the mode selection key.

When the call by the one-touch dial is to be mode, the operator depresses one specific alphabet key. Thus, the telephone number registered for that alphabet is automatically called. For example, if the key "A" is depressed, the telephone number 123-4321 is automatically called.

Figure 16A:
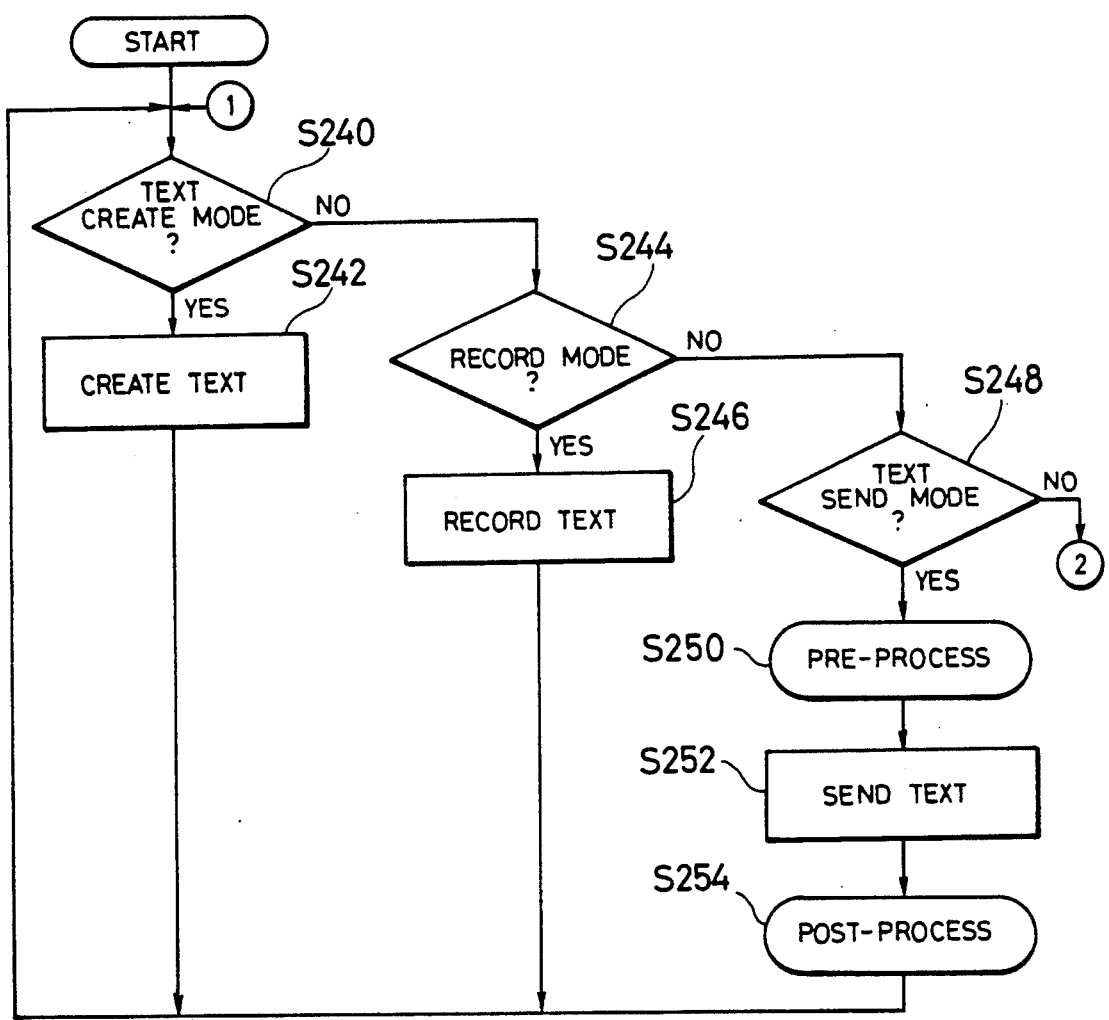
FIGS. 16A and 16B are flow charts of a control operation of a control circuit in the fourth embodiment.
Figure 16B:
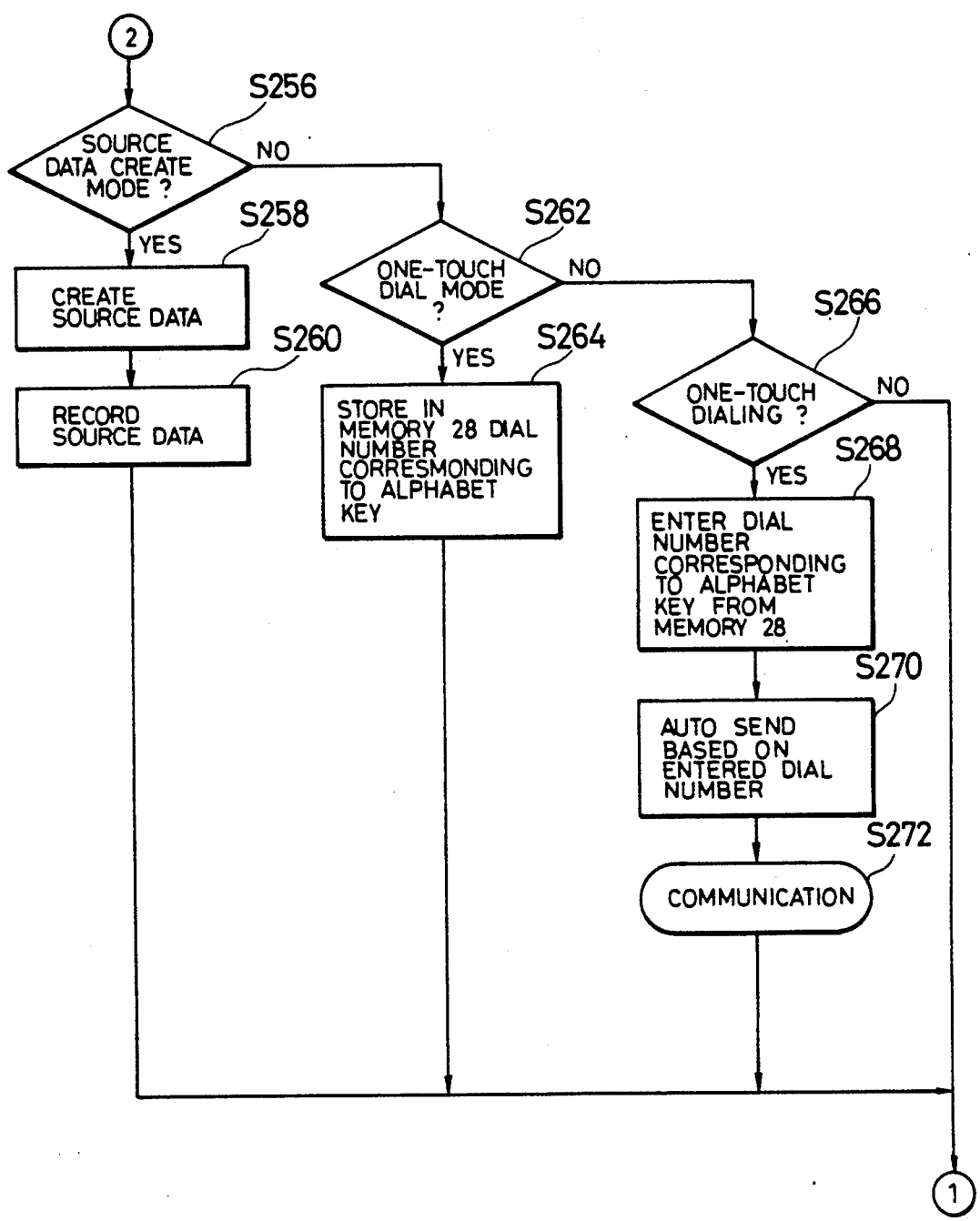

FIGS. 16A and 16B show flow charts of a control procedure to be executed by the control circuit of FIG. 15. A "0" level signal is initially supplied to the signal line 432a and the telephone line is connected to the telephone set. A "0" level signal is supplied to the signal line 432b to transmit the information read from the document.

In a step S240, whether the text generation mode has been selected or not, that is, whether the mode selection key and the numeric key "1" have been depressed or not is checked (by the signals on the signal lines 422b and 422c). If the text generation mode has been selected, that is, if the mode selection key and the numeric key "1" have been depressed, the process proceeds to a step S242. If the text generation mode has not been selected, that is, if the mode selection key and the numeric key "1" have not been sequentially depressed, the process proceeds to a step S244.

In the step S242, the text is generated by the ten-key, alphabet keys, * key, # key and cursor move key of the console unit. The key entries are checked by the signals on the signal lines 422a, 422b and 422c. The text is generated in the text generator 426 through the signal line 432g. Ten-character information on the left and right of the cursor is supplied to the signal line 432d. To complete the generation of the text, operator again depresses the mode selection key.

In the step S244, whether the text record mode has been selected or not, that is, whether the mode selection key and the "W" key have been depressed or not is checked ( by the signal on the signal line 422a). If the text record mode has been selected, that is, if the mode selection key and the "W" key have been depressed, the process proceeds to a step S246. On the other hand, if the text record mode has not been selected, that is, if the mode selection key and the "W" key have not been depressed, the process proceeds to a step S248.

In the step S246, the generated text is recorded. A pulse is supplied to the signal line 432e.

In the step S248, whether the text send mode has been selected or not, that is, whether the text send key has been depressed or not is checked (by the signal on the signal line 422c). If the text send mode has been selected, that is, if the text send key has been depressed, the process proceeds to a step S250. On the other hand, if the text send mode has not been selected, that is, if the text send key has not been depressed, the process proceeds to a step S256.

The step S250 is a pre-procedure. In the step S250, a "1" level signal is supplied to the signal line 432a and the telephone line is connected to the facsimile machine.

In a step S252, the text is transmitted. A "1" level signal is supplied to the signal line 432h before the image transmission to encode the signal supplied from the text generator 426. After the transmission of the text, a "0" level signal is supplied to the signal line 432h to transmit &he information read from the document.

A step S254 is a post procedure. After the post procedure, a "0" level signal is supplied to the signal line 432a to connect the telephone line to the telephone set.

In a step S256, whether the source information generation (or caller data creator) mode has been selected or not, that is, whether the mode selection key and the numeric key "4" have been sequentially depressed or not is checked (by the signals on the signal lines 422b and 422c). If the source information generation mode has been selected, that is, if the mode selection key and the numeric key "4" have been sequentially depressed, the process proceeds to a step S258. On the other hand, if the source information generation mode has not been selected, that is, when the mode selection key and the numeric key "4" have not been sequentially depressed, the process proceeds to a step S262.

In the step S258, the source information is generated by depressing the ten-key, alphabet keys, * key, # key and cursor move key of the console unit. The key inputs are checked by the signals on the signal lines 422a, 422b and 422c. Ten-character information on the left and right of the cursor is supplied to the signal line 432d. When the mode selection key is again depressed later, the input source information is supplied to the signal line 432l, and a write pulse is supplied to the signal line 432n to store the source information into the source information memory 430.

In a step S260, a pulse is supplied to the signal line 432f to record the source information.

In a step S262, whether the one-touch dial input mode has been selected or not, that is, whether the mode selection key and the numeric key "5" have been sequentially depressed or not is checked (by the signals on the signal lines 422b and 422c). If the one-touch dial input mode has been selected, that is, if the mode selection key and the numeric key "5" have been sequentially depressed, the process proceeds to a step S264. On the other hand, if the one-touch dial input mode has not been selected, that is, if the mode selection key and the numeric key "5" have not been sequentially depressed, the process proceeds to a step S266.

In the step S264, an alphabet key and a dial number corresponding to the alphabet key are entered and stored in the one-touch dial number memory 428 by the signals on the signal lines 422a and 422b. The control circuit 432 supplies the information (alphabet and telephone number) of the row on which the cursor is located to the signal line 432d. When the mode selection key is thereafter depressed, the input alphabet and telephone number are supplied to the signal line 432i. Then, a write pulse is supplied to the signal line 432k.

In the step S266, whether the one-touch dial call has been made or not, that is, whether one of the alphabet keys has been depressed o not is checked (by the signal on the signal line 422a). If the one-touch dial call has been made, that is, if one of the alphabet keys has been depressed, the process proceeds to a step S268. On the other hand, if the one-touch dial call has not been made, that is, if no alphabet key has been depressed, the process proceeds to a step S240.

In the step S268, the dial number corresponding to the alphabet key is read from the one-touch dial number memory 428. Specifically, the input alphabet is supplied to the signal line 432i, a read pulse is supplied to the signal line 432j and then the dial number on the signal line 432i is read in.

In a step S270, the automatic call is made to the dial number read in the step S268. Specifically, the dial number read in the step S268 is supplied to the signal line 432c, and then a call command pulse is supplied to the signal line 432b.

A step S272 represents a communication operation.

In the present embodiment, the alphabet keys are used as one-touch dial keys and the keys for generating the source information and the text. The ten-key, * key and # key may also be used as the preset dial keys or to generate the source information or the text.

In accordance with the fourth embodiment, the character keys such as alphabet keys and ten-key can be used as the one touch dial keys, preset dial keys or keys to generate the source information or the text. Accordingly, a general purpose data communication apparatus which effectively utilizes the character keys such as alphabet keys and ten-key is provided.

In the third and fourth embodiments, the data is sequentially generated by the key inputs. Alternatively, specific information may be prestored in a memory and a desired information may be read from the memory when it is to be transmitted. An embodiment therefor is explained below as a fifth embodiment.

Figure 17:
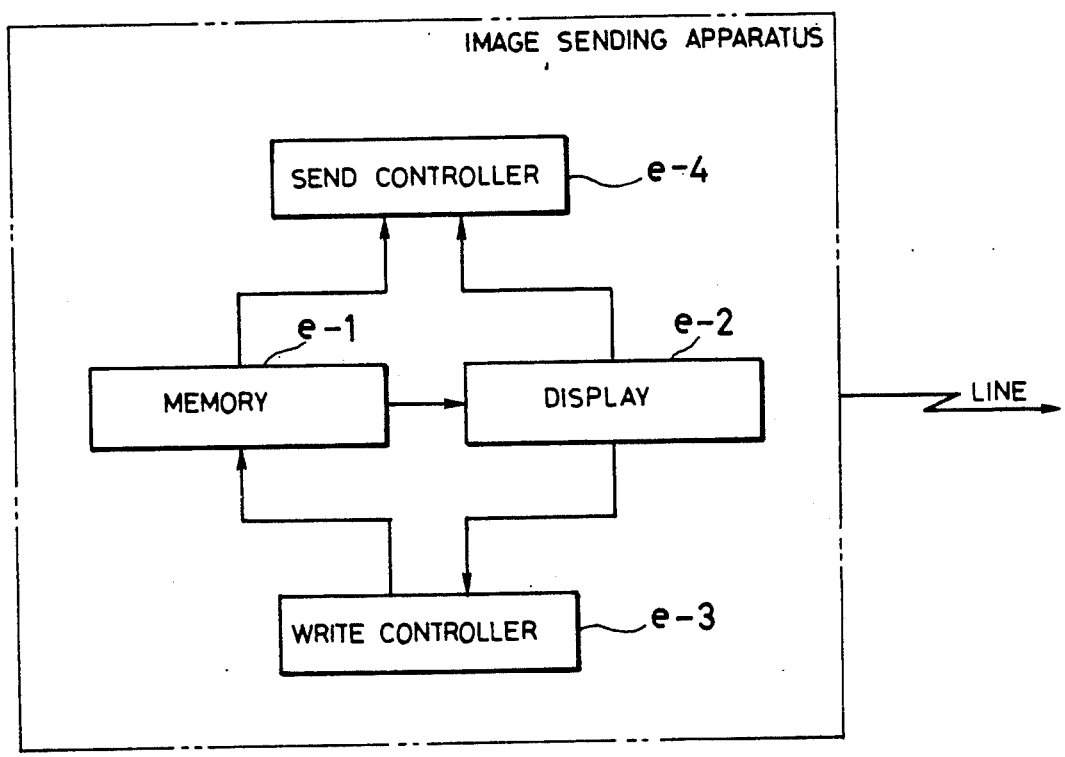
FIG. 17 is a block diagram of a basic configuration of a fifth embodiment.

FIG. 17 is a block diagram of a basic configuration of the fifth embodiment. The fifth embodiment comprises memory means e-1 for storing a text containing specific code information, display means e-2 for displaying the text stored in and read from the memory e-1, write control means e-3 for writing a desired code information into an area corresponding to the specific code, of the text displayed on the display means e-2, and transmission control means e-4 for transmitting the generated text alone or together with the image information.

The operation of the fifth embodiment is now explained. A portion of the stored text can be corrected by depressing the ten-key and alphabet keys. When the numeric key "3" is depressed following to the function key, an operation mode to store a text title is set. Then, for example, "TEL?" is keyed in by sequentially depressing the keys "T", "E", "L" and "?". Then, the function key is depressed.

A text for the key input (for example, "TEL?") is then prepared. When the text is prepared, the ten-key pad, alphabet keys and cursor move keys for moving the cursor vertically and horizontally, are used. The "?" key is also used. The "?" is inserted at a portion in the text where a correction is to be made. When the "?" key is depressed, a query text is entered following to "?". The query text is parenthesized by {( )}.

The * key functions as a space key and the # key functions as a return key.

The text is generated by using those keys. Line information (for example, left and right ten-character information) is displayed on an LCD of the console unit.

After the text has been generated, the operator again depresses the function key. Thus, the keyed-in text is stored.

For example, if the keys "function", "3", "T", "E", "L", "?", "function", "? Mr. or Mrs. (name), please call me. B TEL→03-123-4321" and "function" are sequentially depressed, the text "? Mr. or Mrs. ( ), please call me. B TEL→03-123-4321" is stored for the key-in "TEL?". When the "function", "3" "TEL?" and "function" keys are again depressed after the text has been stored, the text is read out, and the text can be amended at this time.

When the "function", "TEL?" and "function" keys are sequentially depressed, the text "? Mr. or Mrs. (name), please call me. B TEL→03-123-4321" stored for "TEL?" is recorded on a record sheet.

When the generated text is to be transmitted, the line is connected and "TEL?" is keyed in. The mark ? means an end of the abbreviation.

The "name" is displayed on the LCD of the console unit. Then the key "A", for example, is depressed, and then the start key is depressed.

When the auto-call is to be made, the one-touch dial key, preset dial key or ten-key is used, and then "TEL?", "A" and "start" keys are depressed. Thus, the generated text can be transmitted to the destination of the auto-call.

Figure 18:
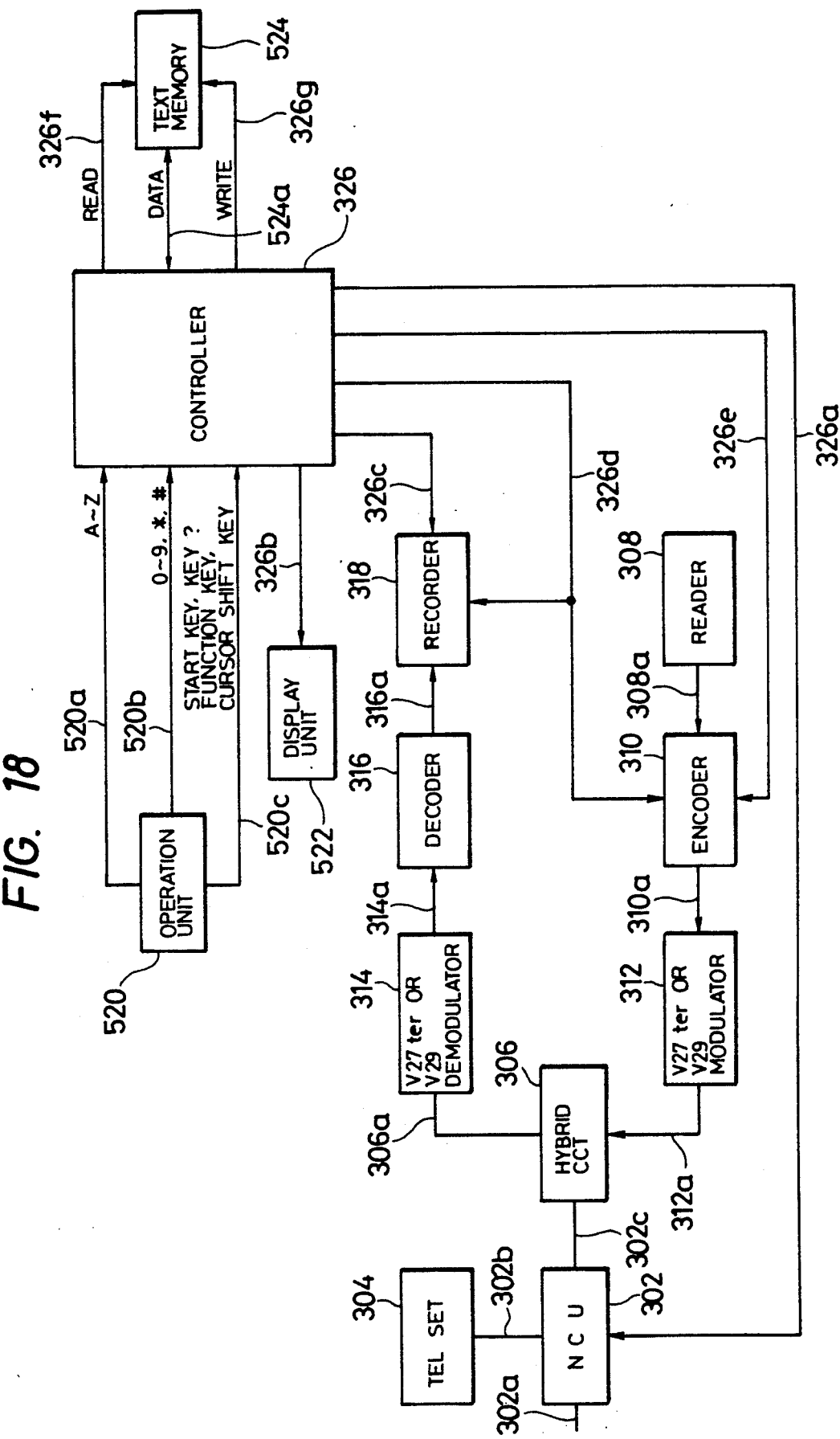
FIG. 18 is a block diagram of a detail of the fifth embodiment.

FIG. 18 shows a detailed block diagram of the fifth embodiment. The line numerals to those shown in FIG. 12 designate the like elements and the explanation thereof is omitted.

A difference between the fifth embodiment of (FIG. 17) and the third embodiment (FIG. 12) resides in the point that functions of console unit 520, display unit 522 and control circuit 326 are slightly different, and that the text generator 324 is eliminated and a text memory 524 is added.

Numeral 520 denotes a console unit. When alphabet keys A-Z of the console unit are depressed, signals are supplied to the signal line 520a. When numeric keys 0-9, * key and # key are depressed, signals are supplied to the signal line 520b. When start key, function key, "?" key and cursor move keys are depressed, signals are supplied to the signal line 520c.

Numeral 522 denotes a display unit which displays ten characters on the left and right of the cursor and a querry text for the "?" in the text. The ten-character information on the left and right of the cursor, or the querry text for the "?" in the text is supplied to the signal line 326b.

Numeral 524 denotes a battery backed-up text memory which stores texts for predetermined abbreviations. When an abbreviation and a corresponding text are to be written into the text memory 524, a data consisting of the abbreviation (for example, "TEL?") * the text (for example, "? Mr. or Mrs. (name), please call me. B TEL→03-123-4321") is supplied to the signal line 524a, and then a write pulse is supplied to the signal line 326g.

When the data stored in the text memory is to be read out, the data consisting of the abbreviation (for example, "TEL") is supplied to the signal line 524a, and then a read pulse is supplied to the signal line 326f by the control circuit 326. Thus, the text (for example, "? Mr. or Mrs. (name), please call me. B TEL.→03-123-4321") stored for the abbreviation (for example, "TEL?") is supplied to the signal line 524a.

Numeral 326 denotes a control circuit which controls the operation described below.

The text is generated by the console unit and stored. An operator depresses the function key and then the "3" key. Thus, the mode in which a text is generated for a certain key-in (including an abbreviation key) and stored is selected. Then, the operator depresses the function key.

The operator then generates a text by using the ten-key, alphabet keys, * key, # key, ? key and cursor move keys. After he/she has entered the text, he/she depresses the function key.

When the text for the abbreviation is to be recorded on a record sheet, the operator depresses the function key and then serially depresses the abbreviation, function key and "W" key.

When the text stored for the abbreviation is to be transmitted to the other station, the line is connected and the operator enters the abbreviation, depresses the key for the querry (the querry text is displayed on the LCD of the console unit), and the depresses the start key.

Figure 19:
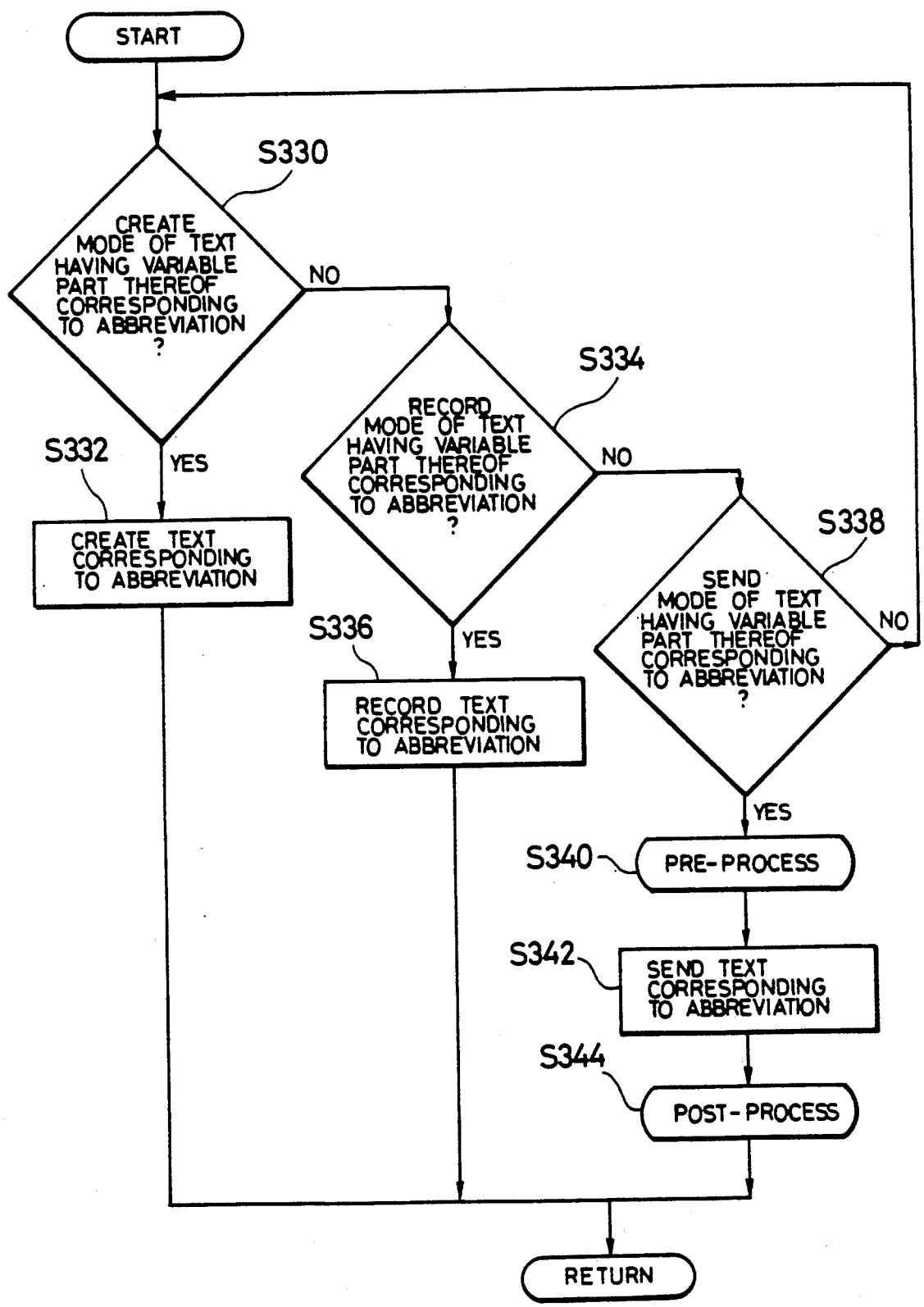
FIG. 19 is a flow chart of a control operation of a control circuit of the fifth embodiment.

FIG. 19 shows a flow chart of a control procedure to be executed by the control circuit 326 of FIG. 18.

In FIG. 19, a "0" level signal is initially supplied to the signal line 326a and the telephone line is connected to the telephone set. A "0" level signal is supplied to the signal line 326e to transmit the information read from the document.

In a step S330, whether the mode for generating the text for the abbreviation has been selected or not, that is, whether the keys "function" and "3" have been depressed or not is checked (by the signals on the signal lines 520b and 520c). If such a mode has been selected, that is, if the keys "function" and "3" have been depressed, the process proceeds to a step S332. On the other hand, if such a mode has not been selected, that is, if the keys "function" and "3" have not been depressed, the process proceeds to a step S334.

In the step S332, a text for the abbreviation is prepared. (A portion of the text is variable.) The operator keys in the abbreviation by the console unit. (For example, "TEL?".) Then, he/she depresses the function key, and then generates the text by using the ten-key, alphabet keys, * key, # key, cursor move keys and ? key of the console unit. For example, a text "? Mr. or Mrs.(name), please call me. B TEL→03-123-4321" is generated. The control circuit 326 detects those key inputs by the signals on the signal lines 520a, 520b and 520c.

Ten-character information on the left and right of the cursor is supplied to the signal line 326b. When the function key is depressed, the text generated for the abbreviation is stored. Specifically, the control circuit 326 supplies the signal representing the "abbreviation" *

"text" to the signal line 524a, and then supplies a write pulse to the signal line 326g. Thus, the abbreviation and the corresponding text are stored in the text memory 524.

In a step S334, whether a record mode to record the text generated for the abbreviation on a record sheet or not has been selected or not, that is, whether the keys "function", "abbreviation" (for example, "TEL?"), "function" and "W" have been sequentially depressed or not is checked (by the signals on the signal lines 520a, 520b and 520c). record mode has been selected, that is, if the keys "function", "abbreviation", "function" and "W" have been sequentially depressed, the process proceeds to a step S336. On the other hand, if the record mode has not been selected, that is, if the keys "function", "abbreviation", "function" and "W" have not been sequentially depressed, the process proceeds to a step S338.

In the step S336, the text for the abbreviation (having a variable portion) is recorded. Specifically, the signal representing the abbreviation (for example, "TEL?") is supplied to the signal line 524a and then a read pulse is supplied to the signal line 326f. The signal on the signal line 524a, that is, the text (for example, "? Mr. or Mrs. (name), please call me. B TEL→03-123-4321") generated for the abbreviation is supplied to the control circuit 326. The text for the abbreviation is then supplied to the signal line 326d and a pulse is supplied to the signal line 326c.

In the step S338 whether the transmit mode for transmitting the text for the abbreviation (having the variable portion has been selected or not, that is, whether the "abbreviation" (for example, "TEL?") has been keyed in or not is checked (by the signals on the signal lines 520a, 520b and 520c). If the transmit mode has not been selected, that is, if the "abbreviation" (for example, "TEL?") has not been keyed in, the process proceeds to a step S330. On the other hand, if the transmit mode has been selected, that is, if the "abbreviation" (for example, "TEL?") has been keyed in, the following control is done.

The abbreviation is supplied to the signal line 524a and then a read pulse is supplied to the signal line 326f. The signal on the signal line 524a, that is, the text generated for the abbreviation is read in.

As the control circuit 326 detects "?", it supplies a text in the parentheses (for example, "name") to the signal line 326b and displays it on the display unit 522. Let us assume that an operator depresses "A" (which represents a name) and then the start key. The process proceeds to a step S340.

As the process proceeds to the step S340, a "1" level signal is supplied to the signal line 326a and the telephone line is connected to the facsimile machine.

The step S340 represents a pre-procedure. In a step S342, the text for the abbreviation (having a variable portion) is transmitted. Of the signal on the signal line 324a, "?" and the information in the parentheses are substituted by the keyed-in information, and the modified information is supplied to the signal line 326d. Specifically, "?" (name) is substituted by "A". Thus, the text "Mr. or Mrs. A, please call me. B TEL→03-123-4321" is supplied to the signal line 326d. Before the image is transmitted, a "1" level signal is supplied to the signal line 326e so that the encoder 310 reads in the signal on the signal line 326d and encodes it. At the end of the transmission of the text, a "0" level signal is supplied to the signal line 326e to transmit the information read from the document.

A step S344 represents a post procedure. At the end of the post procedure, a "0" level signal is supplied to the signal line 326a to connect the telephone line to the telephone set.

In the fifth embodiment, only one text portion is corrected, although a plurality of text portions may be corrected.

In accordance with the fifth embodiment, frequently used texts are previously stored and portions thereof are corrected or added to complete the text. Accordingly, a desired text can be transmitted to the other station either singly or together with the image information.

Since the data and name in the text can be interactively amended by the key operation, the stored text can be more effectively utilized. Since the characters are transmitted as type font, the transmitted image is easy to watch.

In accordance with the present embodiment, communication between different types of communication apparatus is attained.

In the first, second, third, fourth and fifth embodiments, the facsimile machine is used as the data communication apparatus. Alternatively, other data communication apparatus such as telex machine may be used.

We claim:

1. A communication apparatus comprising:
   image data communication means for communicating image data;
   character data processing means for processing data;
   detect means for detecting a calling signal from a destination;
   send means for sending a protocol signal for image data communication to the destination in response to detection of the calling signal;
   receive means for receiving a dial signal from the destination; and
   control means for controlling said image data communication means to perform image data communication upon reception of a response signal from the destination representing an image data communication procedure responsive to the protocol signal, and for controlling said character data process means to process said character data upon reception of a specific signal by said receive means while said receive means is waiting to receive the response signal.

2. A communication apparatus according to claim 1, wherein said character data process means processes character data in accordance with a dial signal received by said receive means.

3. A communication apparatus according to claim 2, wherein said character data process means includes converter means for converting a dial signal into character data, and processes the character data converted by said converter means.

4. A communication apparatus according to claim 3, wherein respective characters are represented by respective combinations of two dial signals each, and said converter means includes a memory storing a character font to be accessed by such combinations of two dial signals received by said receive means.

5. A communication apparatus according to claim 4, wherein said character data process means converts the received dial signals into character data sequentially.

6. A communication apparatus according to claim 2, wherein said character data process means includes a memory storing a plurality of messages therein and means for outputting a message, and selects a message from the memory to cause said output means to output the message so selected.

7. A communication apparatus according to claim 6, wherein said message output means records and outputs a message.

8. A communication apparatus according to claim 1, further comprising recording means for recording image data and character data processed by said character data process means.

9. A communication system comprising:
image data communication means for communicating image data;
record means for recording image data;
memory means storing at least one message therein;
detect means for detecting a calling signal from a destination;
send means for sending a protocol signal for image data communication to the destination in response to detection of the calling signal;
receive means for receiving a dial signal from the destination; and
control means for controlling said image data communication means to perform image data communication upon reception of a response signal from the destination representing an image data communication procedure responsive to the protocol signal, and for controlling said record means to record a message stored in said memory means upon reception of a specific signal by said receive means while said receive means is waiting to receive said response signal.

10. A communication apparatus according to claim 9, wherein said control means converts a message stored in said memory means into image data and said record means records the converted image data.

11. A communication apparatus according to claim 9, further comprising means for adding character data to a message recorded by said record means, in response to a dial signal received by said receive means, wherein said control means records the message with the added character data.

12. A communication apparatus according to claim 9, wherein said memory stores a plurality of messages and said control means selects from among those messages in response to a dial signal received by said receive means, and records the messages thus selected.

13. A communication system according to claim 9, wherein the at least one message is predetermined.

* * * * *